United States Patent
Morishima et al.

(10) Patent No.: US 7,656,779 B2
(45) Date of Patent: Feb. 2, 2010

(54) METHOD FOR FORMING VISIBLE IMAGES ON OPTICAL RECORDING MEDIUM

(75) Inventors: Morito Morishima, Fukuroi (JP); Akira Usui, Hamamatsu (JP); Yusuke Konagai, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 645 days.

(21) Appl. No.: 10/956,403

(22) Filed: Sep. 30, 2004

(65) Prior Publication Data

US 2005/0121416 A1    Jun. 9, 2005

(30) Foreign Application Priority Data

Sep. 30, 2003    (JP)    ............ P. 2003-342243

(51) Int. Cl.
    *G11B 7/24*    (2006.01)
(52) U.S. Cl. ............ 369/275.4; 369/274; 347/224
(58) Field of Classification Search .......... 369/274, 369/275.4; 347/224, 225
    See application file for complete search history.

(56) References Cited

U.S. PATENT DOCUMENTS

| | | | | |
|---|---|---|---|---|
| 4,967,286 A | * | 10/1990 | Nomula et al. ............ | 386/124 |
| 5,608,717 A | * | 3/1997 | Ito et al. ............ | 369/275.3 |
| 5,748,607 A | * | 5/1998 | Ohira et al. ............ | 369/275.4 |
| 5,751,690 A | * | 5/1998 | Ohira et al. ............ | 369/275.3 |
| 5,781,526 A | * | 7/1998 | Nishizawa et al. ....... | 369/275.3 |
| 6,226,243 B1 | * | 5/2001 | Kobayashi et al. ....... | 369/47.17 |
| 6,259,666 B1 | | 7/2001 | Kobayashi et al. | |
| 6,754,158 B1 | * | 6/2004 | Kobayashi et al. ....... | 369/59.11 |
| 6,862,033 B2 | * | 3/2005 | McClellan ............ | 347/224 |
| 7,050,365 B2 | * | 5/2006 | Morishima ............ | 369/44.32 |
| 7,082,094 B2 | * | 7/2006 | Morishima et al. ......... | 369/116 |
| 7,129,968 B2 | * | 10/2006 | Morishima ............ | 347/253 |
| 7,196,715 B2 | * | 3/2007 | Hanks ............ | 347/224 |
| 7,215,625 B2 | * | 5/2007 | Yamamoto ............ | 369/59.24 |
| 7,219,840 B2 | * | 5/2007 | Hanks ............ | 235/454 |

(Continued)

FOREIGN PATENT DOCUMENTS

CN        1265527 A        9/2000

(Continued)

OTHER PUBLICATIONS

Yamaha Corp. (Sep. 29, 2004). CD-R/RW product Official Website Disc T@2 located at <http://www.yamaha.co.jp/product/computer/handbook/discta2.html>, last visited Sep. 29, 2004, with English translation, four pages.

*Primary Examiner*—Tan X Dinh
(74) *Attorney, Agent, or Firm*—Morrison & Foerster LLP

(57) ABSTRACT

A visible image is formed on an optical disk by using an optical disk recording apparatus that forms a pit with a length defined by recording data (EFM-modulated data) by applying a laser beam onto the optical disk. At least a part of the recording data are replaced with the visible image forming data to generate the recording data containing visible image forming data. When the recording data containing the visible image forming data are recorded on the optical disk, the visible image forming data are extracted from the recording data to act as a gate signal. The visible image is formed by forming a pit defined by the recording data in an area of the gate signal.

12 Claims, 17 Drawing Sheets

U.S. PATENT DOCUMENTS

| | | | |
|---|---|---|---|
| 7,331,055 B2 * | 2/2008 | Onodera et al. | 720/718 |
| 7,336,293 B2 * | 2/2008 | Honda et al. | 347/224 |
| 2001/0040867 A1 * | 11/2001 | Onodera et al. | 369/292 |
| 2004/0062179 A1 * | 4/2004 | Tsurumi et al. | 369/108 |
| 2004/0095866 A1 * | 5/2004 | Morishima et al. | 369/59.24 |
| 2004/0184370 A1 * | 9/2004 | Morishima | 369/47.1 |

FOREIGN PATENT DOCUMENTS

| | | |
|---|---|---|
| EP | 0 643 391 A1 | 3/1995 |
| EP | 1 143 426 A2 | 10/2001 |
| EP | 1 148 484 A2 | 10/2001 |
| EP | 1 308 938 A2 | 5/2003 |
| EP | 1 422 697 A2 | 5/2004 |
| EP | 1 521 252 A2 * | 6/2005 |
| JP | 06-140910 | 5/1994 |
| JP | 07-326054 | 12/1995 |
| JP | 2000-242925 | 2/1999 |
| JP | 2004-039029 | 2/2002 |
| JP | 2002-288836 | 10/2002 |
| JP | 2005-108354 * | 4/2005 |

* cited by examiner

| | | | | | | | |
|---|---|---|---|---|---|---|---|
| 1 | S0 | | | | | | |
| 2 | S1 | | | | | | |
| 3 | P1 | Q1 | R1 | S1 | T1 | U1 | V1 | W1 |
| 4 | P2 | Q2 | R2 | S2 | T2 | U2 | V2 | W2 |
| 5 | | | | ● | | | |
| 6 | | | | ● | | | |
| ⋮ | | | | ● | | | |
| 95 | P93 | Q93 | R93 | S93 | T93 | U93 | V93 | W93 |
| 96 | P94 | Q94 | R94 | S94 | T94 | U94 | V94 | W94 |
| 97 | P95 | Q95 | R95 | S95 | T95 | U95 | V95 | W95 |
| 98 | P96 | Q96 | R96 | S96 | T96 | U96 | V96 | W96 |
| 1 | S0 | | | | | | |
| 2 | S1 | | | | | | |
| ⋮ | P1 | Q1 | R1 | S1 | T1 | U1 | V1 | W1 |
| | P2 | Q2 | R2 | S2 | T2 | U2 | V2 | W2 |
| | | | | ● | | | | |

FIG. 12

| FRAME NUMBER | CONTENTS OF SUB CODE DATA Dsub | | | | | | CONTENTS OF VISIBLE IMAGE FORMING DATA Dx | | |
|---|---|---|---|---|---|---|---|---|---|
| | | | | | S0 | | | S0 | |
| | | | | | | S1 | | | S1 |
| 1 | | | | | | | | | |
| 2 | | | | | | | | | |
| 3 | P1 | Q1 | R1 | S1 | ... | W1 | Cm1 | PWM1 | (0,1,2,3,4,5,6) |
| 4 | P2 | Q2 | R2 | S2 | ... | W2 | Cm2 | PWM2 | (0,1,2,3,4,5,6) |
| 5 | P3 | Q3 | R3 | S3 | ... | W3 | Cm3 | PWM3 | (0,1,2,3,4,5,6) |
| 6 | P4 | Q4 | R4 | S4 | ... | W4 | Cm4 | PWM4 | (0,1,2,3,4,5,6) |
| 7 | P5 | Q5 | R5 | S5 | ... | W5 | Cm5 | PWM5 | (0,1,2,3,4,5,6) |
| 8 | P6 | Q6 | R6 | S6 | ... | W6 | Cm6 | PWM6 | (0,1,2,3,4,5,6) |
| 9 | P7 | Q7 | R7 | S7 | ... | W7 | Cm7 | PWM7 | (0,1,2,3,4,5,6) |
| 10 | P8 | Q8 | R8 | S8 | ... | W8 | Cm8 | PWM8 | (0,1,2,3,4,5,6) |
| 11 | P9 | Q9 | R9 | S9 | ... | W9 | Cm9 | PWM9 | (0,1,2,3,4,5,6) |
| 12 | P10 | Q10 | R10 | S10 | ... | W10 | Cm10 | PWM10 | (0,1,2,3,4,5,6) |
| 13 | P11 | Q11 | R11 | S11 | ... | W11 | Cm11 | PWM11 | (0,1,2,3,4,5,6) |
| 14 | P12 | Q12 | R12 | S12 | ... | W12 | Cm12 | PWM12 | (0,1,2,3,4,5,6) |
| 15 | P13 | Q13 | R13 | S13 | ... | W13 | Cm13 | PWM13 | (0,1,2,3,4,5,6) |
| 16 | P14 | Q14 | R14 | S14 | ... | W14 | Cm14 | PWM14 | (0,1,2,3,4,5,6) |
| 17 | P15 | Q15 | R15 | S15 | ... | W15 | Cm15 | PWM15 | (0,1,2,3,4,5,6) |
| 18 | P16 | Q16 | R16 | S16 | ... | W16 | Cm16 | PWM16 | (0,1,2,3,4,5,6) |
| 19 | P17 | Q17 | R17 | S17 | ... | W17 | Cm17 | PWM17 | (0,1,2,3,4,5,6) |
| 20 | P18 | Q18 | R18 | S18 | ... | W18 | Cm18 | PWM18 | (0,1,2,3,4,5,6) |
| ... | ... | ... | ... | ... | ... | ... | ... | ... | ... |
| 95 | P93 | Q93 | R93 | S93 | ... | W93 | Cm93 | PWM93 | (0,1,2,3,4,5,6) |
| 96 | P94 | Q94 | R94 | S94 | ... | W94 | Cm94 | PWM94 | (0,1,2,3,4,5,6) |
| 97 | P95 | Q95 | R95 | S95 | ... | W95 | Cm95 | PWM95 | (0,1,2,3,4,5,6) |
| 98 | P96 | Q96 | R96 | S96 | ... | W96 | Cm96 | PWM96 | (0,1,2,3,4,5,6) |

FIG. 20

| FRAME NUMBER | CONTENTS OF SUB CODE DATA Dsub | | | | | CONTENTS OF VISIBLE IMAGE FORMING DATA Dx | | |
|---|---|---|---|---|---|---|---|---|
| | | | | | | | S0 | |
| | | | | | | | | S1 |
| 1 | | | | | | | | |
| 2 | | | | | | | | |
| 3 | P1 | Q1 | R1 | S1 | ... | W1 | Cm1 | 0 | PWM1 | (0,1,2)×2 |
| 4 | P2 | Q2 | R2 | S2 | ... | W2 | Cm2 | 0 | PWM2 | (0,1,2)×2 |
| 5 | P3 | Q3 | R3 | S3 | ... | W3 | Cm3 | 0 | PWM3 | (0,1,2)×2 |
| 6 | P4 | Q4 | R4 | S4 | ... | W4 | Cm4 | 0 | PWM4 | (0,1,2)×2 |
| 7 | P5 | Q5 | R5 | S5 | ... | W5 | Cm5 | 0 | PWM5 | (0,1,2)×2 |
| 8 | P6 | Q6 | R6 | S6 | ... | W6 | Cm6 | 0 | PWM6 | (0,1,2)×2 |
| 9 | P7 | Q7 | R7 | S7 | ... | W7 | Cm7 | 0 | PWM7 | (0,1,2)×2 |
| 10 | P8 | Q8 | R8 | S8 | ... | W8 | Cm8 | 0 | PWM8 | (0,1,2)×2 |
| 11 | P9 | Q9 | R9 | S9 | ... | W9 | Cm9 | 0 | PWM9 | (0,1,2)×2 |
| 12 | P10 | Q10 | R10 | S10 | ... | W10 | Cm10 | 0 | PWM10 | (0,1,2)×2 |
| 13 | P11 | Q11 | R11 | S11 | ... | W11 | Cm11 | 0 | PWM11 | (0,1,2)×2 |
| 14 | P12 | Q12 | R12 | S12 | ... | W12 | Cm12 | 0 | PWM12 | (0,1,2)×2 |
| 15 | P13 | Q13 | R13 | S13 | ... | W13 | Cm13 | 0 | PWM13 | (0,1,2)×2 |
| 16 | P14 | Q14 | R14 | S14 | ... | W14 | Cm14 | 0 | PWM14 | (0,1,2)×2 |
| 17 | P15 | Q15 | R15 | S15 | ... | W15 | Cm15 | 0 | PWM15 | (0,1,2)×2 |
| 18 | P16 | Q16 | R16 | S16 | ... | W16 | Cm16 | 0 | PWM16 | (0,1,2)×2 |
| 19 | P17 | Q17 | R17 | S17 | ... | W17 | Cm17 | 0 | PWM17 | (0,1,2)×2 |
| 20 | P18 | Q18 | R18 | S18 | ... | W18 | Cm18 | 0 | PWM18 | (0,1,2)×2 |
| ... | ... | ... | ... | ... | ... | ... | ... | ... | ... | ... |
| 95 | P93 | Q93 | R93 | S93 | ... | W93 | Cm93 | 0 | PWM93 | (0,1,2)×2 |
| 96 | P94 | Q94 | R94 | S94 | ... | W94 | Cm94 | 0 | PWM94 | (0,1,2)×2 |
| 97 | P95 | Q95 | R95 | S95 | ... | W95 | Cm95 | 0 | PWM95 | (0,1,2)×2 |
| 98 | P96 | Q96 | R96 | S96 | ... | W96 | Cm96 | 0 | PWM96 | (0,1,2)×2 |

FIG. 21

| FRAME NUMBER | CONTENTS OF SUB CODE DATA Dsub | | | | | CONTENTS OF VISIBLE IMAGE FORMING DATA Dx | | | | |
|---|---|---|---|---|---|---|---|---|---|---|
| | | | | S0 | S1 | | | | S0 | S1 |
| 1 | | | | | | | | | | |
| 2 | | | | | | | | | | |
| 3 | P1 | Q1 | R1 | S1 | W1 | P1 | Q1 | Cm1 | PWM1 | (0, 1, 2, 3, 4) |
| 4 | P2 | Q2 | R2 | S2 | W2 | P2 | Q2 | Cm2 | PWM2 | (0, 1, 2, 3, 4) |
| 5 | P3 | Q3 | R3 | S3 | W3 | P3 | Q3 | Cm3 | PWM3 | (0, 1, 2, 3, 4) |
| 6 | P4 | Q4 | R4 | S4 | W4 | P4 | Q4 | Cm4 | PWM4 | (0, 1, 2, 3, 4) |
| 7 | P5 | Q5 | R5 | S5 | W5 | P5 | Q5 | Cm5 | PWM5 | (0, 1, 2, 3, 4) |
| 8 | P6 | Q6 | R6 | S6 | W6 | P6 | Q6 | Cm6 | PWM6 | (0, 1, 2, 3, 4) |
| 9 | P7 | Q7 | R7 | S7 | W7 | P7 | Q7 | Cm7 | PWM7 | (0, 1, 2, 3, 4) |
| 10 | P8 | Q8 | R8 | S8 | W8 | P8 | Q8 | Cm8 | PWM8 | (0, 1, 2, 3, 4) |
| 11 | P9 | Q9 | R9 | S9 | W9 | P9 | Q9 | Cm9 | PWM9 | (0, 1, 2, 3, 4) |
| 12 | P10 | Q10 | R10 | S10 | W10 | P10 | Q10 | Cm10 | PWM10 | (0, 1, 2, 3, 4) |
| 13 | P11 | Q11 | R11 | S11 | W11 | P11 | Q11 | Cm11 | PWM11 | (0, 1, 2, 3, 4) |
| 14 | P12 | Q12 | R12 | S12 | W12 | P12 | Q12 | Cm12 | PWM12 | (0, 1, 2, 3, 4) |
| 15 | P13 | Q13 | R13 | S13 | W13 | P13 | Q13 | Cm13 | PWM13 | (0, 1, 2, 3, 4) |
| 16 | P14 | Q14 | R14 | S14 | W14 | P14 | Q14 | Cm14 | PWM14 | (0, 1, 2, 3, 4) |
| 17 | P15 | Q15 | R15 | S15 | W15 | P15 | Q15 | Cm15 | PWM15 | (0, 1, 2, 3, 4) |
| 18 | P16 | Q16 | R16 | S16 | W16 | P16 | Q16 | Cm16 | PWM16 | (0, 1, 2, 3, 4) |
| 19 | P17 | Q17 | R17 | S17 | W17 | P17 | Q17 | Cm17 | PWM17 | (0, 1, 2, 3, 4) |
| 20 | P18 | Q18 | R18 | S18 | W18 | P18 | Q18 | Cm18 | PWM18 | (0, 1, 2, 3, 4) |
| ... | ... | ... | ... | ... | ... | ... | ... | ... | ... | ... |
| 95 | P93 | Q93 | R93 | S93 | W93 | P93 | Q93 | Cm93 | PWM93 | (0, 1, 2, 3, 4) |
| 96 | P94 | Q94 | R94 | S94 | W94 | P94 | Q94 | Cm94 | PWM94 | (0, 1, 2, 3, 4) |
| 97 | P95 | Q95 | R95 | S95 | W95 | P95 | Q95 | Cm95 | PWM95 | (0, 1, 2, 3, 4) |
| 98 | P96 | Q96 | R96 | S96 | W96 | P96 | Q96 | Cm96 | PWM96 | (0, 1, 2, 3, 4) |

METHOD FOR FORMING VISIBLE IMAGES ON OPTICAL RECORDING MEDIUM

BACKGROUND OF THE INVENTION

The present invention relates to a visible image forming method, a program, and a visible image forming system for forming a visible image in addition to the data recording on an optical disk.

The optical disk recording apparatus capable of forming the visible image such as the character, the pattern, or the like apart from the essential data recording onto the optical disk such as CD-R (Compact Disc-Recordable), or the like is provided currently. The optical disk recording apparatus of this type optically denatures a part of the unrecorded area by applying the laser beam onto the unrecorded area onto which the data recording was not applied, to thus form the character or the pattern as the visible image (For example, see Non-Patent Literature 1).

Non-Patent Literature 1:

Yamaha Corporation, CD-R/RW product official web site DiscT@2, (online), Heisei 14 August 2, Yamaha Corporation, (Search on Oct. 11, 2002 through Internet)
<URL:http://www.yamaha.co.jp/product/computer/handbook/disc ta2.html>

However, in order to execute the visible image formation in the up-to-date optical disk recording apparatus, the format of the signal used to modulate the laser beam that is applied onto the optical disk at the time of recording the data (for example, EFM modulation signal: Eight To Fourteen Modulated Signal) and the format of the signal used to modulate the laser beam that is applied onto the optical disk at the time of forming the visible image are different. Therefore, the signal processing circuit used in the data recording and the signal processing circuit used in the visible image formation must be provided respectively. For this reason, a scale of the signal processing circuit must be enlarged, a control LSI must be newly designed/manufactured, and a control program must be largely varied.

The data-recording signal processing circuit in the up-to-date optical disk recording apparatus is designed to make possible the high-speed transfer processing by using the parallel processing. Now, if further the visible-image recording signal processing circuit is similarly constructed such that the processing circuit can deal with the high-speed transfer processing, there existed not only the problem such that the overall circuit scale is expanded but also the problem such that the wirings are complicated. In contrast, if the visible-image forming signal processing circuit is designed as the serial processing type, there existed the problem such that the visible image formation is delayed.

In the related art, the data writing system is constructed as the CLV data writing system having the constant linear velocity. Therefore, it is difficult to realize the polar coordinate system that permits such writing system to form the visible image with good precision.

SUMMARY OF THE INVENTION

The present invention has been made to overcome above respects, and it is an object of the present invention to provide a visible image forming method capable of executing the visible image formation on an optical disk on a polar coordinate system by which the visible image can be drawn quickly with good precision, a program used therein, and a visible image forming system for implementing the method. Accordingly, expansion of the circuit scale and complication of the wirings in a signal processing circuit of the optical disk recording apparatus can be avoided.

In order to solve the aforesaid object, the invention is characterized by having the following arrangement.

(1) A visible image forming method of forming a visible image on an optical disk by using an optical disk recording apparatus comprising the steps of:

generating first recording data at a generation frequency that makes a recording density on the optical disk constant;

applying a laser beam onto the optical disk in response to the first recording data to form a pit with a length defined by the first recording data on the optical disk;

controlling the generation frequency and a rotation frequency of the optical disk into a predetermined ratio;

extracting visible image forming data from the first recording data every predetermined quantity of the first recording data;

deciding a pit forming area designated by the visible image forming data; and forming a pit with a length defined by the first recording data in the pit forming area.

(2) The visible image forming method according to (1) further comprising a step of replacing at least a part of a data unit constituting the first recording data with the visible image forming data.

(3) The visible image forming method according to (2), wherein the data unit includes a subcode data portion and a main data portion, and either a part or all of the subcode data portion or a part or all of the main data portion is replaced with the visible image forming data.

(4) The visible image forming method according to (2) further comprising transforming bit map data, which represent image contents on orthogonal coordinates, into data designating the pit forming area, in which a pit whose length is defined by recording data in individual data units of the first recording data is formed, as the visible image forming data.

(5) A visible image forming method of forming a visible image on an optical disk by using an optical disk recording apparatus comprising the steps of:

generating first recording data at a generation frequency that makes a recording density on the optical disk constant;

applying a laser beam onto the optical disk in response to the first recording data to form a pit with a length defined by the first recording data on the optical disk;

controlling the generation frequency and a rotation frequency of the optical disk into a predetermined ratio;

extracting visible image forming data from the first recording data every predetermined quantity of the first recording data;

deciding a pit forming area designated by the visible image forming data;

selecting second recording data in place of the first recording data; and forming a pit with a length defined by the second recording data in the pit forming area.

(6) The visible image forming method according to (5) further comprising a step of replacing at least a part of a data unit constituting the first recording data with the visible image forming data.

(7) The visible image forming method according to (6), wherein the data unit includes a subcode data portion and a main data portion, and either a part or all of the subcode data portion or a part or all of the main data portion is replaced with the visible image forming data.

(8) The visible image forming method according to (6) further comprising transforming bit map data, which represent image contents on orthogonal coordinates, into data designating the pit forming area, in which a pit whose length is defined by recording data in individual data units of the first recording data is formed, as the visible image forming data.

(9) A visible image forming method of forming a visible image on an optical disk by using an optical disk recording apparatus comprising the steps of:

generating first recording data at a generation frequency that makes a recording density on the optical disk constant;

applying a laser beam onto the optical disk in response to the first recording data to form a pit with a length defined by the first recording data on the optical disk;

controlling the generation frequency and a rotation frequency of the optical disk into a predetermined ratio;

extracting visible image forming data from the first recording data every predetermined quantity of the first recording data;

deciding a pit forming area designated by the visible image forming data; and forming a pit with a length defined by the pit forming area in the pit forming area.

(10) The visible image forming method according to (9) further comprising a step of replacing at least a part of a data unit constituting the first recording data with the visible image forming data.

(11) The visible image forming method according to (10), wherein the data unit includes a subcode data portion and a main data portion, and either a part or all of the subcode data portion or a part or all of the main data portion is replaced with the visible image forming data.

(12) The visible image forming method according to (10) further comprising transforming bit map data, which represent image contents on orthogonal coordinates, into data designating the pit forming area, in which a pit whose length is defined by recording data in individual data units of the first recording data is formed, as the visible image forming data.

(13) A computer readable recording medium storing a program that causes, to form a visible image on an optical disk, a visible image forming system including a host computer and an optical disk recording apparatus that generates first recording data at a generation frequency that makes a recording density on the optical disk constant, and applies a laser beam onto the optical disk in response to the first recording data to form a pit with a length defined by the first recording data on the optical disk, the program causing the visible image forming system to:

replace at least a part of the first recording data with visible image forming data every predetermined quantity of the first recording data;

control the generation frequency and a rotation frequency of the optical disk into a predetermined ratio;

extract the visible image forming data from the first recording data every predetermined quantity of the first recording data;

decide a pit forming area designated by the visible image forming data; and form a pit with a length defined by the first recording data in the pit forming area.

(13) A visible image forming system for forming a visible image on an optical disk comprising:

a data generating portion that generates first recording data at a generation frequency that makes a recording density on the optical disk constant;

a laser beam applying portion that applies a laser beam onto the optical disk in response to the first recording data to form a pit with a length defined by the first recording data on the optical disk;

a recording data generating portion that generates at least a part of the first recording data as visible image forming data every predetermined quantity of the first recording data;

a controlling portion that controls the generation frequency and a rotation frequency of the optical disk into a predetermined ratio;

a visible-image forming data extracting portion that extracts the visible image forming data from the first recording data every predetermined quantity of the first recording data;

a pit-forming area deciding portion that decides a pit forming area designated by the visible image forming data; and a pit forming portion that forms a pit with a length defined by the first recording data in the pit forming area.

(14) The visible image forming system according to (13), wherein the data generating portion and the laser beam applying portion are provided in an optical disk recording apparatus.

As explained above, according to the present invention, the visible image formation can be applied onto the optical disk to neither expand the circuit scale nor complicate the wirings.

BRIEF DESCRIPTION OF THE DRAWINGS

FIG. 12 is a view showing an example of visible image forming data employed in the embodiment of the present invention.

FIG. 20 is a view explaining the variation of the present invention.

FIG. 21 is a view explaining another variation of the present invention.

DETAILED DESCRIPTION OF PREFERRED EMBODIMENTS

A visible image forming system (referred simply to as a "system" hereinafter) 700 constructed by applying the present invention will be explained hereinafter.

Figure 1:
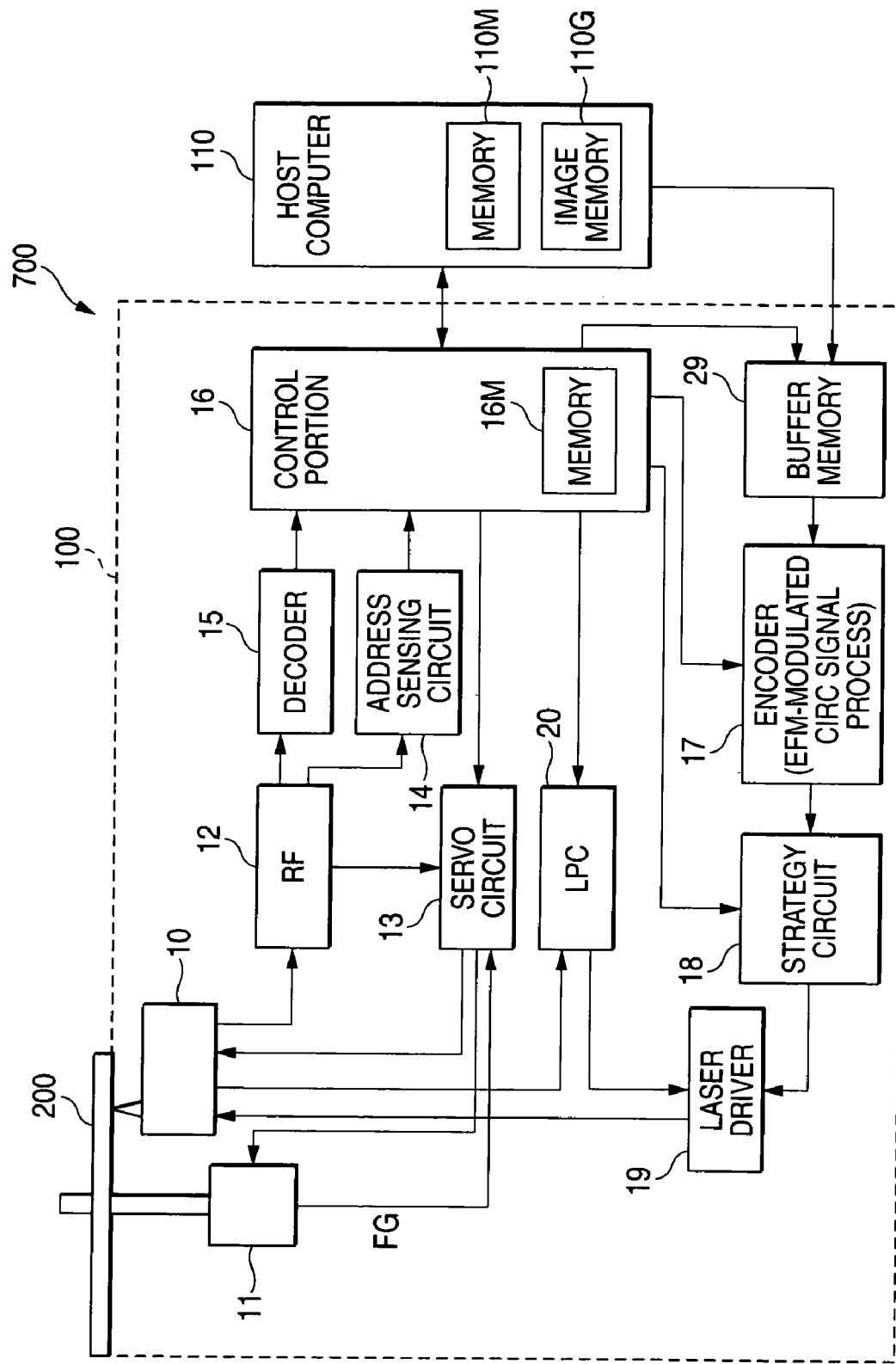
FIG. 1 is a configurative view of a visible image forming system 700 according to an embodiment of the present invention.

A configurative view of a visible image forming system 700 is shown in FIG. 1. The visible image forming system 700 comprises an optical disk recording apparatus 100 and a host computer 110, and can apply the data recording and the visible image formation on an optical disk 200 that is guided in the optical disk recording apparatus 100.

As shown in FIG. 1, a configuration of the optical disk recording apparatus 100 is almost identical to the normal optical disk recording apparatus that can record/play the data, and is able to form the visible image by utilizing the conventional configuration to the maximum and adding the new configuration to the minimum. It is supposed in the present embodiment that the CD-R is used as the optical disk 200.

Respective constituent elements will be explained hereunder.

(Host Computer 110)

The host computer 110 is constructed by a personal computer, or the like, and has a displaying means, and an inputting means such as a keyboard, or the like. A running program of executing data recording and visible image formation by utilizing the present system 700 is stored previously in the host computer 110. The host computer 110, when executes the data recording by using this running program, outputs the data (audio data, document data, or the like) to be recorded onto the optical disk 200 to the optical disk recording apparatus 100. The host computer 110, when executes the visible image formation, outputs the visible image forming data to be formed on the optical disk 200 (details will be described later) to the optical disk recording apparatus 100. In this case, the audio data, the document data, or the like are stored in a memory 110M and the visible image forming data are stored in an image memory 110G.

(Optical Disk 200)

Then, the optical disk 200 will be explained hereunder. In the following explanation, the CD-R disk is supposed as the optical disk 200. But other optical disks, e.g., DVD-R (Digital Versatile Disc Recordable) may be employed. The double-layer or multi-layered disk, the double-faced disk, the optical disk whose label surface can be drawn by the laser, or the like may be employed. It is desired that an encoder 17 should be operated in an aggregate of data units in which a predetermined quantity of data is used as a unit. In the case of the data that are generated by the encoder in the CD-R recording apparatus, the EFM frame is used as a data unit and a data format is constructed by an aggregate of the EFM frames.

Figure 2:
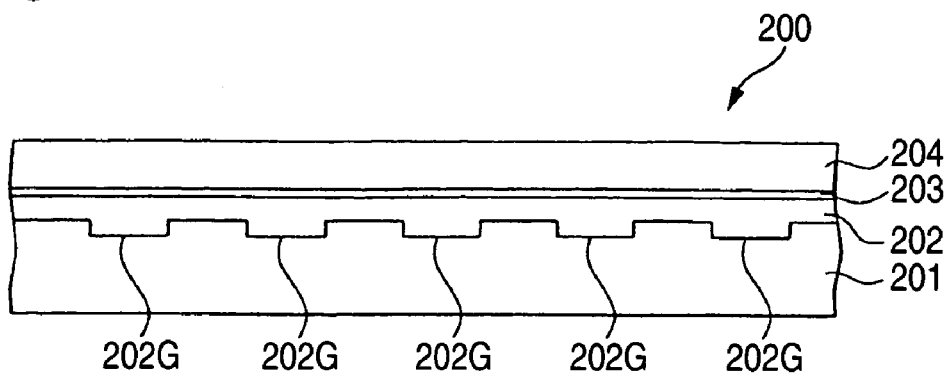
FIG. 2 is a side sectional view of an optical disk 200 according to an embodiment of the present invention.

FIG. 2 is a sectional view of the optical disk 200. As shown in FIG. 2, the optical disk 200 has a structure in which respective layers composed of a protection substrate layer 201, a recording layer 202, a reflecting layer 203, and a protection layer 204 are laminated. A visible image recording layer may be provided between the protection layer 204 and the reflecting layer 203.

A groove 202G for guiding the laser beam is formed spirally on one face of the protection substrate layer 201. The recording layer 202, the reflecting layer 203, and the protection layer 204 are laminated on the groove 202G. The laser beam is applied onto the groove 202G from the opposite face to the face on which the groove 202G is formed, and records the image on the groove 202G while being guided along the groove 202G (on-groove recording).

The recording layer 202 is constructed such that its reflectance is changed when a temperature reaches a predetermined temperature or more by applying the laser beam. An area whose reflectance becomes different from other areas when whose temperature reaches the predetermined temperature or more by applying the laser beam acts as a pit 202P. An area between the pits 202P is called a land.

The reflecting layer 203 is provided to increase the reflectance of the optical disk 200 up to a predetermined value or more.

The protection layer 204 is provided to protect the reflecting layer 203 and the recording layer 202.

Next, the step of applying the data recording and the visible image formation on the optical disk 200 will be explained hereunder.

Figure 3:
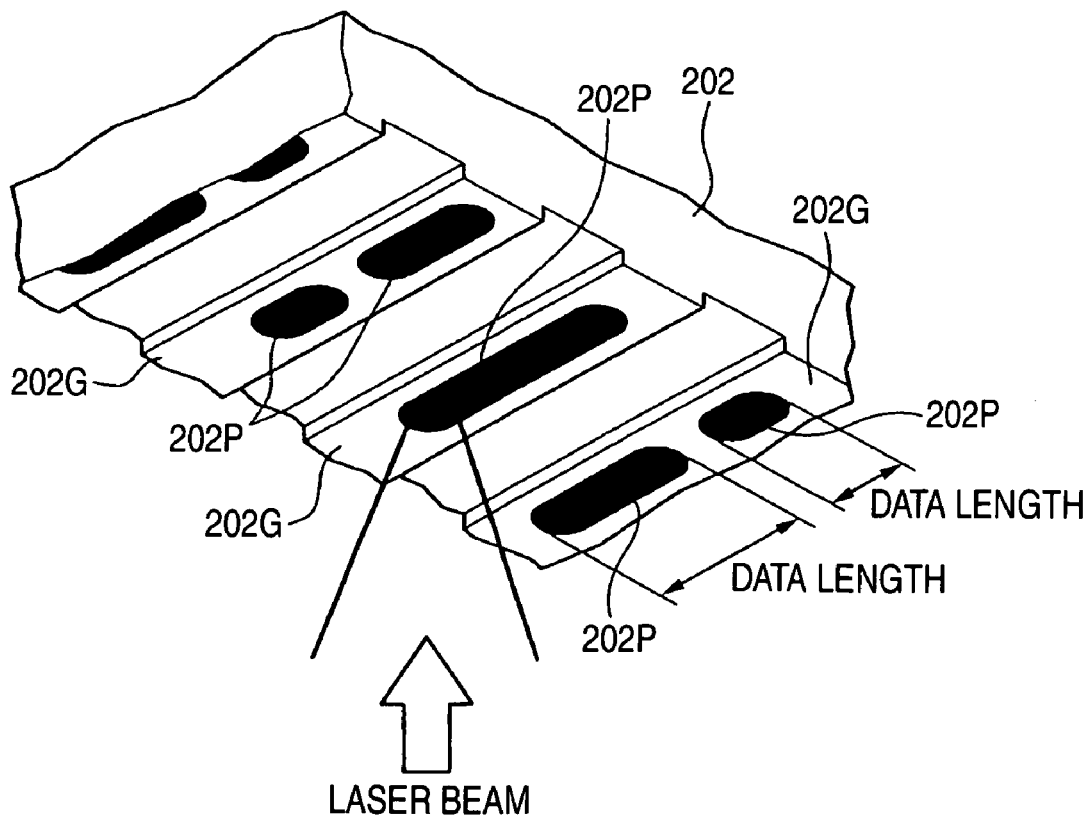
FIG. 3 is a view showing a state in which pits 202P are formed on the optical disk 200.

At first, the data recording will be explained hereunder. FIG. 3 is a view showing a state in which the pits 202P and the lands are formed on the grooves 202G as the result that the laser beam is applied along the groove 202G. Individual lengths of the pits 202P and the lands correspond to lengths defined by the recording data. In detail, the length is set to almost several hundreds nm to several μm.

The reflectance of the pit 202P is different from that of the land, and normally the reflectance of the pit 202P is set lower than the land. When the data recorded in this manner are played, a reflected beam having an intensity in answer to a difference between the reflectances can be obtained by applying the reproducing laser beam along the groove 202G. The reproduced data can be obtained by sensing an interval between changes in the intensity of the reflected beam.

Figure 4:
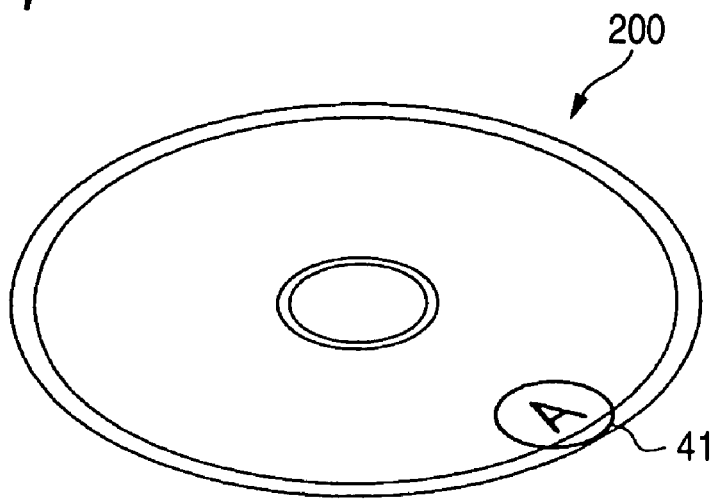
FIG. 4 is a view explaining the state in which the pits 202P are formed on the optical disk 200.
Figure 5:
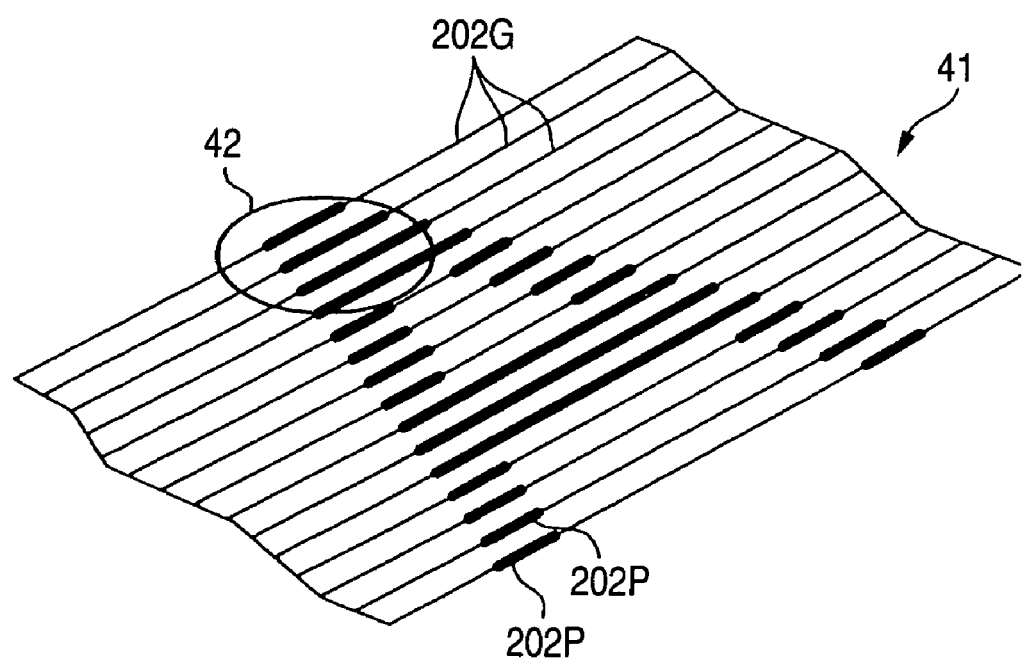
FIG. 5 is a view explaining the state in which the pits 202P are formed on the optical disk 200.
Figure 6:
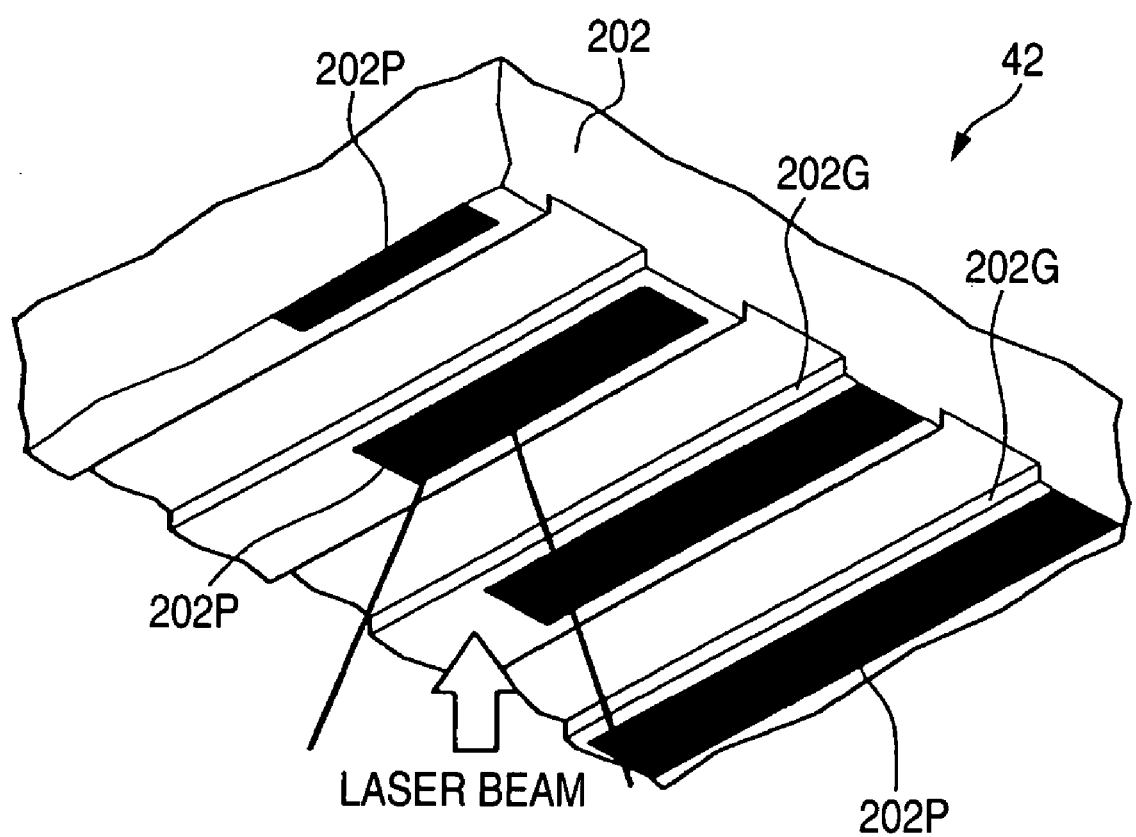
FIG. 6 is a view explaining the state in which the pits 202P are formed on the optical disk 200.

Then, the visible image formation will be explained hereunder. Like the data recording, the visible image formation can be executed by forming the pit 202P on the groove 202G. FIG. 4, FIG. 5, and FIG. 6 show a state that the visible image is formed by forming the pit 202P on the optical disk 200. Here, an example in which an alphabetical character "A" is formed as the visible image is shown.

FIG. 4 shows the overall image of the optical disk 200 when viewed from the recording face side. FIG. 5 is an enlarged view of an area 41 in FIG. 4. FIG. 6 is an enlarged view of an area 42 in FIG. 5. As shown in FIG. 5 and FIG. 6, the pit 202P is formed on the grooves 202G positioned between profiles of the character "A" respectively. When the pit 202P is formed on the grooves 202G positioned between profiles of the visible image in this manner, the pits 202P can be recognized as the visible image as shown in FIG. 4.

Figure 7:
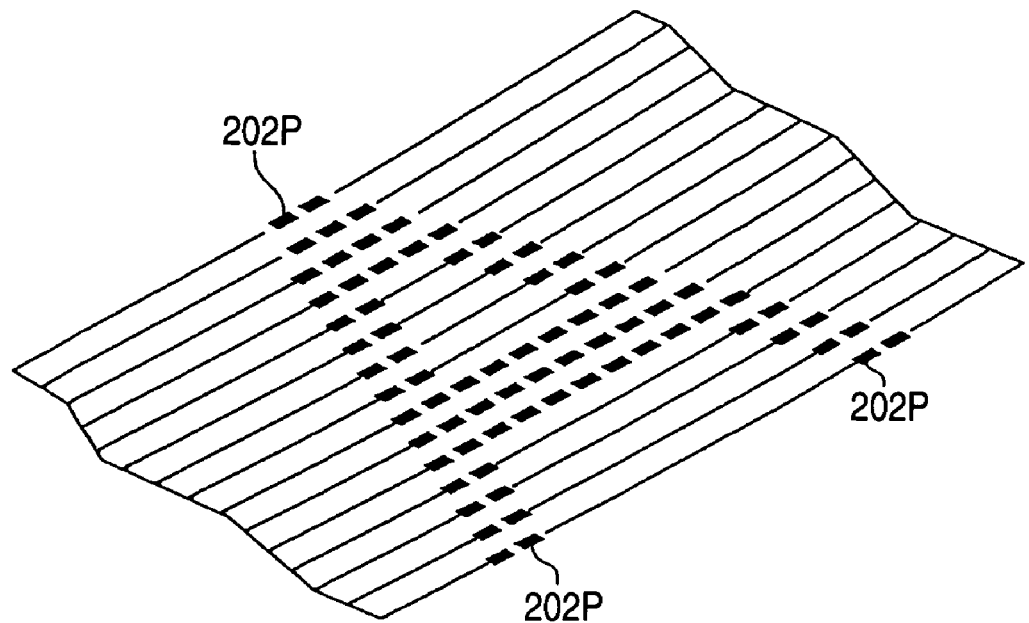
FIG. 7 is a view showing an example of the visible image formation.
Figure 8:
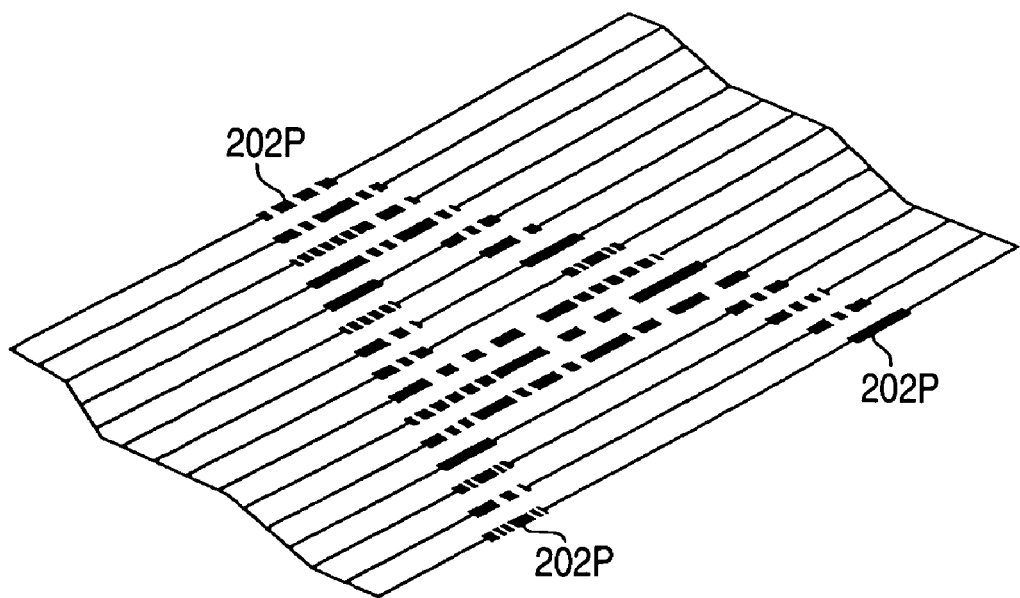
FIG. 8 is a view showing another example of the visible image formation.

Here, the length of the pit 202P formed on the grooves 202G positioned between profiles of the visible image may set arbitrarily. As shown in FIG. 5, the pit having a length almost equal to a profile interval may be formed. The pit having the same length may be formed successively between the profiles, as shown in FIG. 7, otherwise the pit may be formed between the profiles by utilizing the data-writing EFM data signals, as shown in FIG. 8. In all cases, the character "A" can be visibly recognized when the optical disk 200 is looked at as a whole.

(Optical Disk Recording Apparatus 100)

Next, the optical disk recording apparatus 100 will be explained hereunder.

As shown in above FIG. 1, a configuration of the optical disk recording apparatus 100 is almost identical to the normal optical disk recording apparatus that can record/play the data, and is able to form the visible image by utilizing the conventional configuration as much as possible and adding the new configuration as small as possible.

A control portion 16 controls respective portions of the system in compliance with programs stored previously in a memory (storing portion) 16M.

A spindle motor 11 turns and drives the optical disk (CD-R) 200. An optical pickup 10 is composed of a laser diode, an optical system such as an objective lens, a mirror, etc., a light receiving element for a return light, a monitor diode, and so forth. When the data recording or the visible image formation is applied to the optical disk 200 and the data are read from the optical disk 200, the optical pickup 10 applies the laser beam onto the optical disk 200 or receives the return light reflected from the optical disk 200. Irradiation of the laser beam is carried out in response to a driving current that is fed from a laser driver 19 to the laser diode. Such driving current is modulated based on the recording data or the visible image data. The return light is received by the light receiving element, then converted into an electric signal, and then output to an RF amplifier 12. A part of the laser beam applied onto the optical disk 200 is separated by the optical system, then received by the monitor diode and converted into an electric signal, and then output to a laser power control circuit (LPC) 20.

The RF amplifier 12 amplifies the electric signal that is received from the light receiving element, and then outputs it to a decoder 15, an address sensing circuit 14, and a servo circuit 13.

The decoder 15 demodulates the electric signal that is received from the RF amplifier 12 to generate reproduced data, and then outputs the data to the control portion 16. More particularly, the laser beam applied onto the optical disk 200 to reproduce the data is modulated by the pits 202P and reaches the light receiving element as the return light, and the pits 202P are formed in accordance with the recorded data. Therefore, the return light is given as the EFM-modulated RF signal, and the RF signal is EFM-demodulated by the decoder 15 to give the reproduced data.

Upon executing the data recording or the visible image formation, the address sensing circuit 14 acquires address information and the synchronizing signal from the electric signal received from the RF amplifier 12, and outputs them to the control portion 16. In detail, the groove 202G is formed to wobble based on the frequency of the modulated wave that is obtained by frequency-modulating the fundamental wave (sinusoidal wave) by the address information, so that the component modulated by the grooves 202G (wobble signal) is contained in the RF signal. Therefore, the address signal, etc. can be acquired by extracting the fundamental wave component from the RF signal and then FM-demodulating such component.

The servo circuit 13 executes rotation control of the spindle motor 11, focus control, tracking control, etc. of the optical pickup 10, and so on.

The laser power control circuit 20 adjusts an intensity of the laser beam emitted from the laser diode in the optical pickup 10. The laser power control circuit 20 controls the laser driver 19 in response to a difference between the electric current value supplied from the monitor diode in the optical pickup 10 and a target control value as optimum laser power information supplied from the control portion 16 in such a way that the laser beam having an optimum laser power can be applied onto the optical disk 200 from the optical pickup 10. In this case, the optimum laser power value is derived in advance by executing the recording experiment.

A buffer memory 29 stores the data transferred from the host computer 110, i.e., the data to be recorded onto the optical disk 200 (the audio data, the document data, etc. as main data, and the address information, etc. as subcode data), in the FIFO (First-In First-Out) manner.

The encoder 17 executes the addition of an error correcting code (in the case of CD-R, CIRC: Cross Interleaved Reed-Solomon Code process) to the main data read from the buffer memory 29, etc., and applies the EFM modulation to the main data and the subcode data. The data modulated by the encoder 17 is referred to as first recording data in this application. The first recording data are output to a strategy circuit 18. When the optical disk recording apparatus 100 applies the data recording to the optical disk 200, the pit 202P whose length is defined by the first recording data is formed onto the optical disk 200

The strategy circuit 18 changes a waveform of the signal that is received from the encoder 17. A signal waveform of the first recording data that the encoder 17 outputs represents an irradiation period and a power level of the laser beam that is applied onto the optical disk 200. Normally the pit is formed like a teardrop due to the uneven heat distribution or the remaining heat or the pit is formed to have the prolonged length when the laser irradiation is carried out for a period that is equivalent to the length defined by the first recording data. In order to prevent this phenomenon, the power at the head portion of the laser irradiation period must be enhanced or the rear portion of the laser irradiation period must be early ended. The strategy circuit 18 changes the laser irradiation period and the irradiation power level of the signal of the first recording data, and then outputs the signal to the laser driver 19.

The laser driver 19 supplies the current that is modulated by the signal received from the strategy circuit 18, i.e., the signal whose waveform represents the laser irradiation period and the irradiation power level, to the laser diode in the optical pickup 10. The laser diode applies the laser beam onto the optical disk 200 in accordance with the supplied current. In contrast, since the laser diode has the characteristic such that an output level is varied dependent on the temperature, the feedback loop control is applied to stabilize the output level. The monitor diode in the optical pickup 10 monitors the power level of the laser beam. Then, the laser power control circuit 20 compares the monitored power level with the target power level. Then, the laser driver 19 supplies the driving current having the output level that is adjusted based on the compared result to the laser diode. Thus, the laser diode can emit the laser beam as the stable output.

With the above, the operation of the optical disk recording apparatus 100 when the data recording or the visible image formation is applied to the optical disk 200 and when the data are reproduced from the optical disk 200 is explained.

Next, the first recording data, the visible image forming data, and a configuration and an operation used to form the visible image will be explained hereunder. In the case that the visible image formation is carried out, the spindle motor 11 controls the optical disk 200 to get a constant rotation (CAV: Constant Angular Velocity). In other words, if the optical disk 200 is controlled by using a rotation monitor (FG) signal output from this spindle motor 11, which rotates the optical disk, and a rotation reference clock to rotate at the constant rotation and then the first recording data are generated at a frequency that has a predetermined ratio to this rotation reference clock, the visible image can be formed with good precision on the polar coordinate system.

(First Recording Data)

Figure 9:
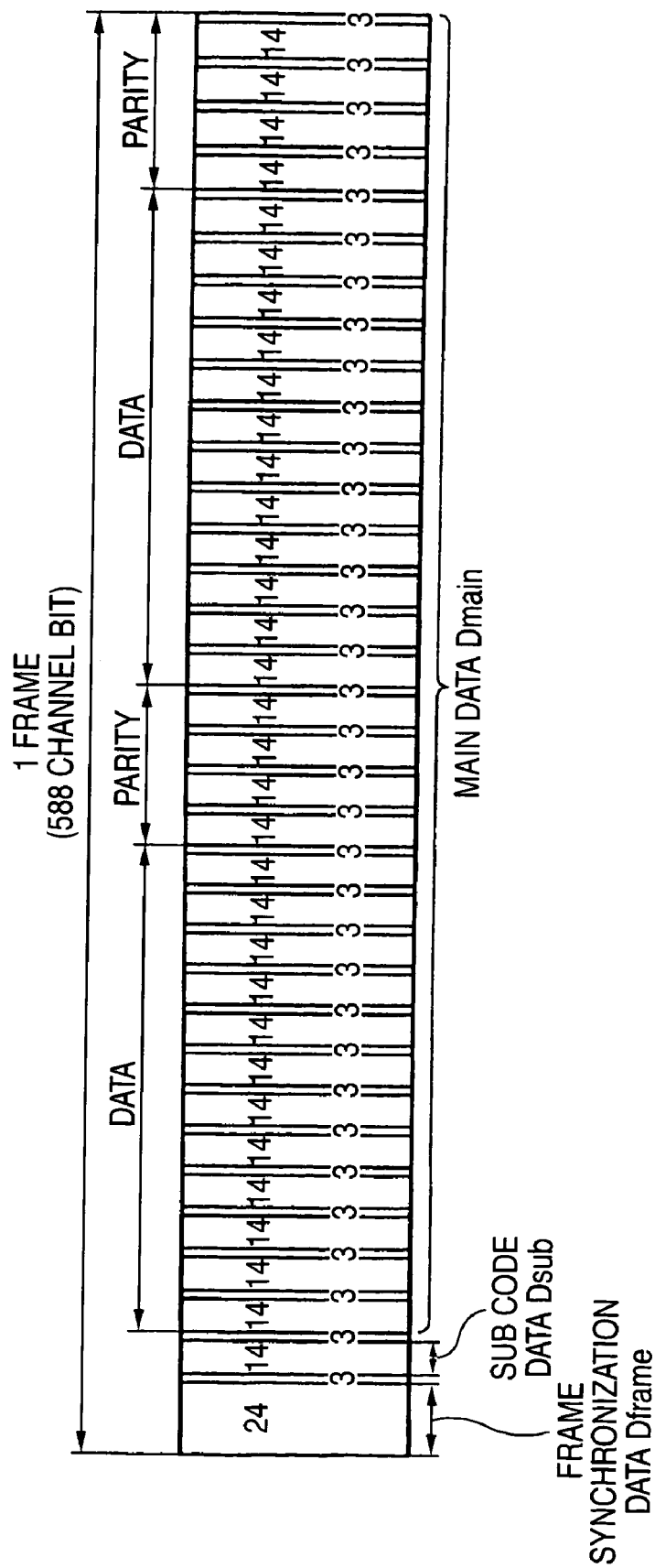
FIG. 9 is a view showing the contents of frame data.

The first recording data signifies the data which are generated by the encoder equipped with the optical disk recording apparatus and whose bit alignment is arranged to construct a predetermined format that is associated with the optical disk as the recording object. In the case of CD-R, such data satisfy the CD format and, in the case of DVD-R, such data satisfy the DVD format. In the case of CD-R, a data unit having a predetermined quantity of data is the aggregate that consists of an EFM frame (referred to as "one frame" or the "EFM frame" hereinafter). FIG. 9 represents a data format of one frame. One frame corresponds to 588 channel bits. A 24-bit frame synchronization data Dframe is arranged at a head of one frame. The frame synchronization data Dframe is a signal having a predetermined bit pattern, and is used as the synchronization data indicating the head of one frame when the data reproduction is carried out. In this case, the frame synchronization data Dframe serves as the site to check the power level of the applied laser beam when the data recording is carried out.

A subcode data Dsub is arranged subsequently to the frame synchronization data Dframe. The subcode data Dsub consists of 14 bits. The 8-bit data prepared in the host computer 110 is subjected to the EFM-modulation by the encoder 17 and converted into this 14-bit data. The subcode data Dsub will be described later.

A main data Dmain is arranged subsequently to the subcode data Dsub. Normally the music data, the document data, etc. correspond to the main data. The main data Dmain is subjected to the addition of parity data for the data security and interleaved by the encoder 17. In addition, the main data is converted into a 14-bit sample by the EFM-modulation. In this case, 3 bits positioned between the 14-bit samples are margin bits that are added as the DSV countermeasure.

Figures 10, 11:
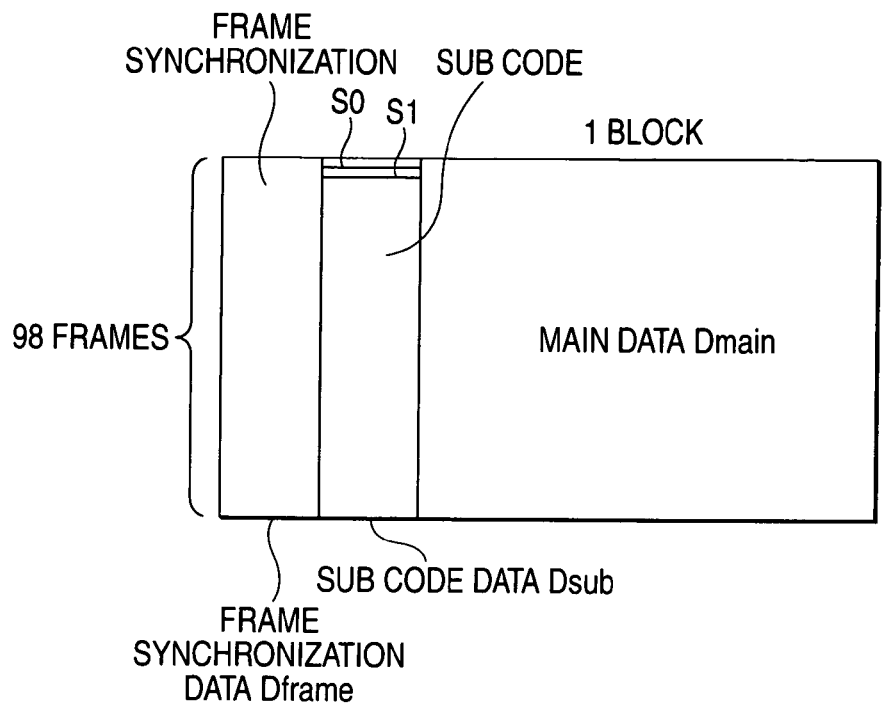
FIG. 10 is a view showing the contents of data consisting of 98 frames (block data).
FIG. 11 is a view showing the contents of subcode data Dsub prior to the coding.

Then, contents of the subcode data Dsub will be explained in detail hereunder. The subcode data Dsub consists of 8 bits, but each bit has no meaning solely. Respective bits out of 8 bits are indicated by P, Q, R, S, T, U, V, W as indices. Respective indices have one meaning by 96 pieces. FIG. 10 shows one block data which consists of 98 EFM frames and which is a unit by which the signal processing is executed. The data on the optical disk 200 is handled in unit of 1 block, and the number of 1 block is identified by the subcode in the block. The subcode data in the first EFM frame and the second EFM frame in the subcode data in the 98 EFM frames are assigned as synchronization data S0, S1, and the subcode block is constructed by remaining 96 frames.

FIG. 11 shows a subcode data Dsub portion in one block data. The 98 EFM frames are represented by affixing the serial numbers (frame numbers). The subcode data in the frame numbers 1 and 2 are synchronization data S0 and S1, as described above. Respective indices are assigned to the subcode data in the frame numbers 3 to 98 like P1, . . . , P96, Q1, . . . , Q96, . . . . The P data and the Q data do not have their meanings until 96 frames from the frame numbers 3 to 98 are arranged properly. In particular, the Q data represent the information about the block or the main data Dmain, and represent the block number and the data type.

In this manner, the first recording data is constructed by the main data Dmain, the subcode data Dsub, and the frame synchronization data Dframe.

Next, the visible image forming data will be explained hereunder.

(Visible Image Forming Data)

The visible image forming data is formed by replacing at least a part of the first recording data with the visible image forming data. The visible image forming data may be prepared as at least a part of the subcode data Dsub and the main data Dmain. A quantity of replaced data depends on a resolution of the visible image to be formed and a performance of the visible image forming system 700. Suppose hereinafter that the visible image forming data signifies both the visible image forming data itself and the first recording data at least a part of which is replaced with the visible image forming data. More concretely, the data derived before the process in the encoder 17 correspond to the visible image forming data, while the data derived after the process in the encoder 17 correspond to the first recording data at least a part of which is replaced with the visible image forming data. Any data may be employed as the data derived before the replacement. Either the dummy data prepared by the host computer 110 or the music data, the document data, or the like may be employed.

The visible image forming data Dx and the subcode data Dsub to be compared is shown in FIG. 12. In FIG. 12, the left part shows the frame number and the subcode data Dsub to be compared, and the right part shows the visible image forming data Dx. The same synchronization data S0, S1 as the subcode data Dsub are assigned to the visible image forming data Dx in the frame numbers 1 and 2. Accordingly, the head portion of the 98 frames (head portion of one block data) can be detected in the visible image forming data Dx by sensing the data S0 and S1.

In order to form the visible image onto the optical disk 200, the visible image forming data Dx in the frame numbers 3 to 98 designates a range in which the pits 202P are to be formed on the optical disk 200. Cmx is command data and is used in various applications. PWMx is data used to designate the range in which the pits 202P are to be formed on the optical disk 200. Now, a PWMx generating method will be explained hereunder.

Figure 13A:
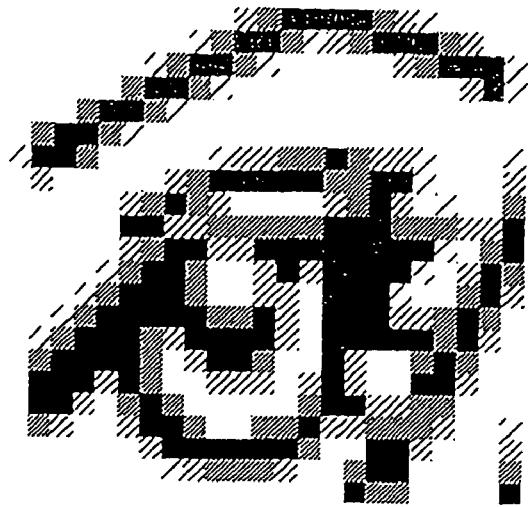
FIG. 13A is a view showing an example of a forming algorithm of the visible image forming data employed in the embodiment of the present invention.
Figure 13B:
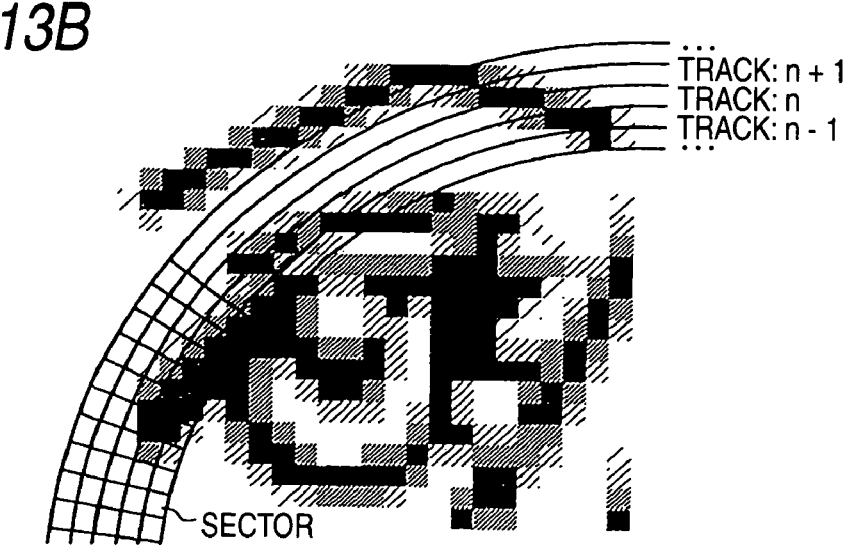
FIG. 13B is a view showing another example of the forming algorithm of the visible image forming data employed in the embodiment of the present invention.

Procedures of converting the visible image displayed by the bit map data into the visible image forming data will be explained with reference to FIG. 13a and FIG. 13b hereunder. FIG. 13a is an enlarged view of a part of the visible image. In FIG. 13a, the visible image is expressed by a density of the cells that are aligned on the XY-coordinates. The density of cells is expressed by a density of dots in the cell. FIG. 13b shows positional relationships between the grooves 202G and respective cells when the bit map data are arranged on the optical disk 200 by sectors on the polar coordinate system that employs a radius position (track position) and a rotating angle position. As shown in FIG. 13b, if a certain cell on the bit map data can be correlated with a certain sector on the groove 202G of the optical disk 200, all cells can be correlated with all sectors. This is because respective areas occupied by all sectors on the optical disk 200 can be decided based on an equal track pitch and an equal rotating angle range. For example, assume now that a track pitch is 1.6 μm and a linear velocity on the radius position is 1.2 m/s, a length of one sector is given as 163 μm. This 1.6 μm×163 μm area yields one cell on the optical disk 200. The polar coordinate system employing the radius position and the rotating angle position on the optical disk 200 is called the CAV coordinate system.

Figure 13C:
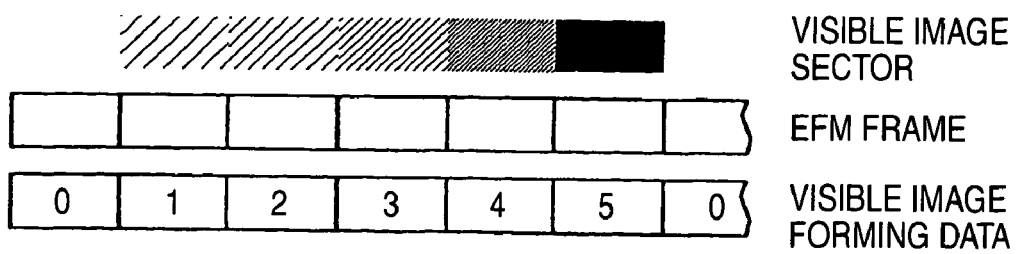
FIG. 13C is a view showing still another example of the forming algorithm of the visible image forming data employed in the embodiment of the present invention.

The visible image forming data are prepared by averaging the densities contained in the correlated sector areas. The visible image forming data generated by correlating the visible image with the sectors are shown in FIG. 13c. If a ratio between a generating frequency of the EFM data as the first recording data and the rotation frequency of the optical disk 200 is controlled at a predetermined ratio, the EFM frame writing area can be employed as the sector. The visible image forming data are in the lowest tone when all the visible images contained in the areas of the EFM frame cells are white, the visible image forming data are in the highest tone when all the visible images contained in the same are black, and the visible image forming data are in the intermediate tone when all the visible images contained in the same are others. Here, because PWMx consists of 7 bits, the lowest tone is represented as 0000000 and the highest tone is represented as 1111111.

In this manner, the visible image forming data are constructed by the command data Cmx and the tone data PWMX. Then, the subcode data Dsub in the first recording data are replaced.

(Configuration and Operation for Visible Image Formation)

Figure 14:
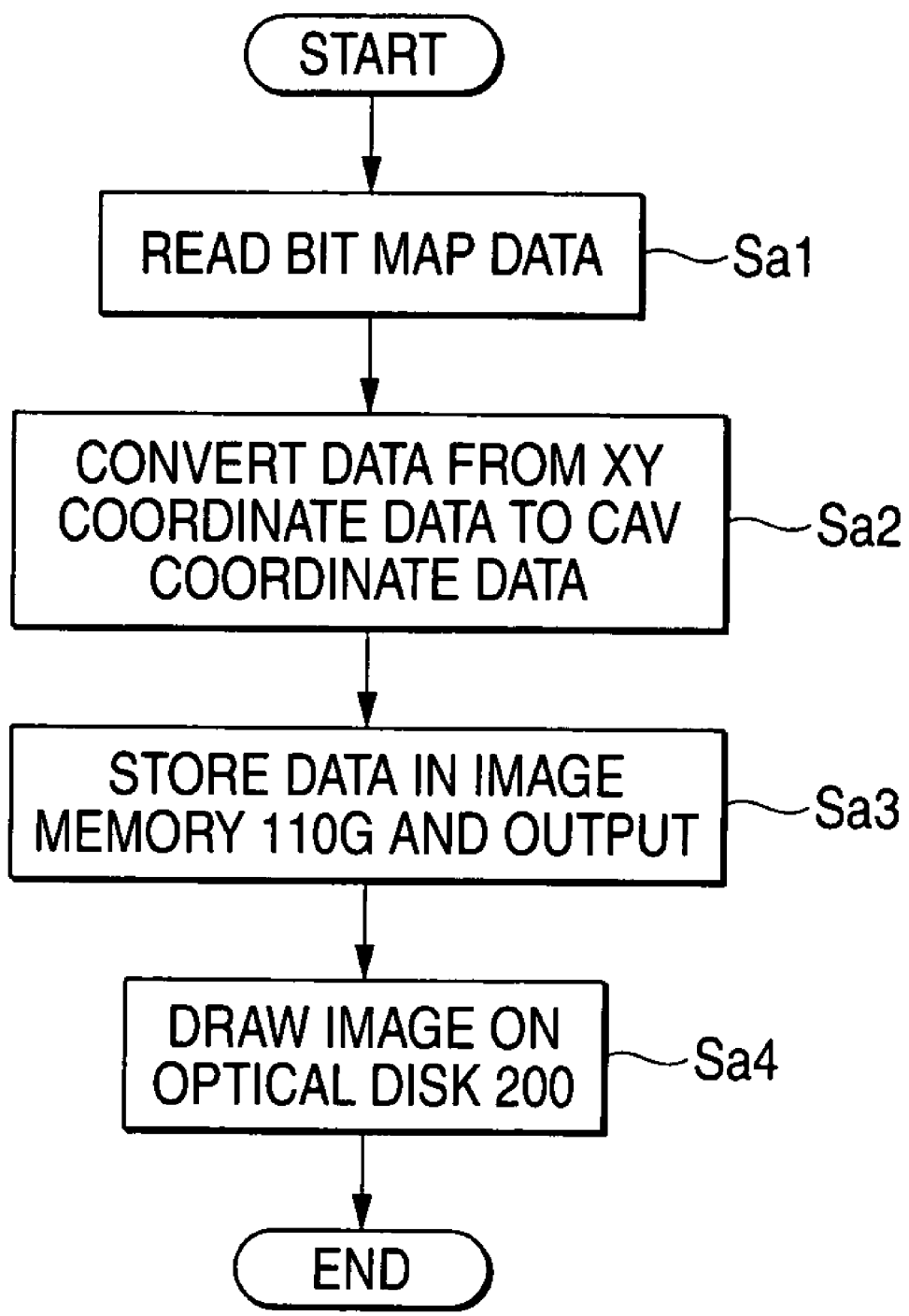
FIG. 14 is a flowchart showing an operation of forming the visible image.

The steps of forming the visible image on the optical disk 200 are shown in FIG. 14.

The host computer 110 starts the dedicated running program for the visible image forming system 700 in answer to the user's predetermined operation. A data communication channel is established between the host computer 110 and the optical disk recording apparatus 100 when this program is started.

The host computer 110 reads the bit map data from the image memory 110G (step Sa1). Then, the host computer 110 executes the data converting process of this bit map data, i.e., executes the data converting process from the XY coordinate system to the CAV coordinate system (step Sa2). Then, the host computer 110 stores the visible image forming data converted into the CAV coordinate system in the image memory 110G (step Sa3). When the visible image formation is to be executed, the host computer 110 transfers the visible image forming data as the subcode data Dsub from the image memory 110G and the dummy data as the main data Dmain to the optical disk recording apparatus 100. Then, the optical disk recording apparatus 100 decides the pit 202P forming area in the EFM frame based on the received visible image forming data, and forms the pit 202P in the decided area (step Sa4).

At this time, it is described above that, if the rotation frequency of the spindle motor 11 and an operating clock frequency of the encoder 17 are kept at a predetermined ratio, the EFM frame period can be employed as the minimum sector on the optical disk 200. For example, if the operating clock is given to the optical disk such that the optical disk 200 is turned at 10 Hz and the EFM frame frequency is operated at 10 kHz, the minimum sector is formed as 360 degree/1000 and has a angular resolution of 0.36 degree. More particularly, the frequency of 10 Hz is generated by dividing the frequency of the master clock and given as the spindle reference clock. Similarly, the clock of 10 kHz may be generated from the master clock and given to the encoder 17. Alternately, if the spindle motor 11 is turned at any rotation frequency and then the FG output is given to the encoder 17 via the multiplexer such as PLL, or the like, the EFM frame whose frequency is 1000 times the FG signal may be produced.

According to the above operations, the visible image can be formed on the polar coordinate system on the optical disk 200.

Then, the step Sa4 will be explained in more detail.

Figure 15:
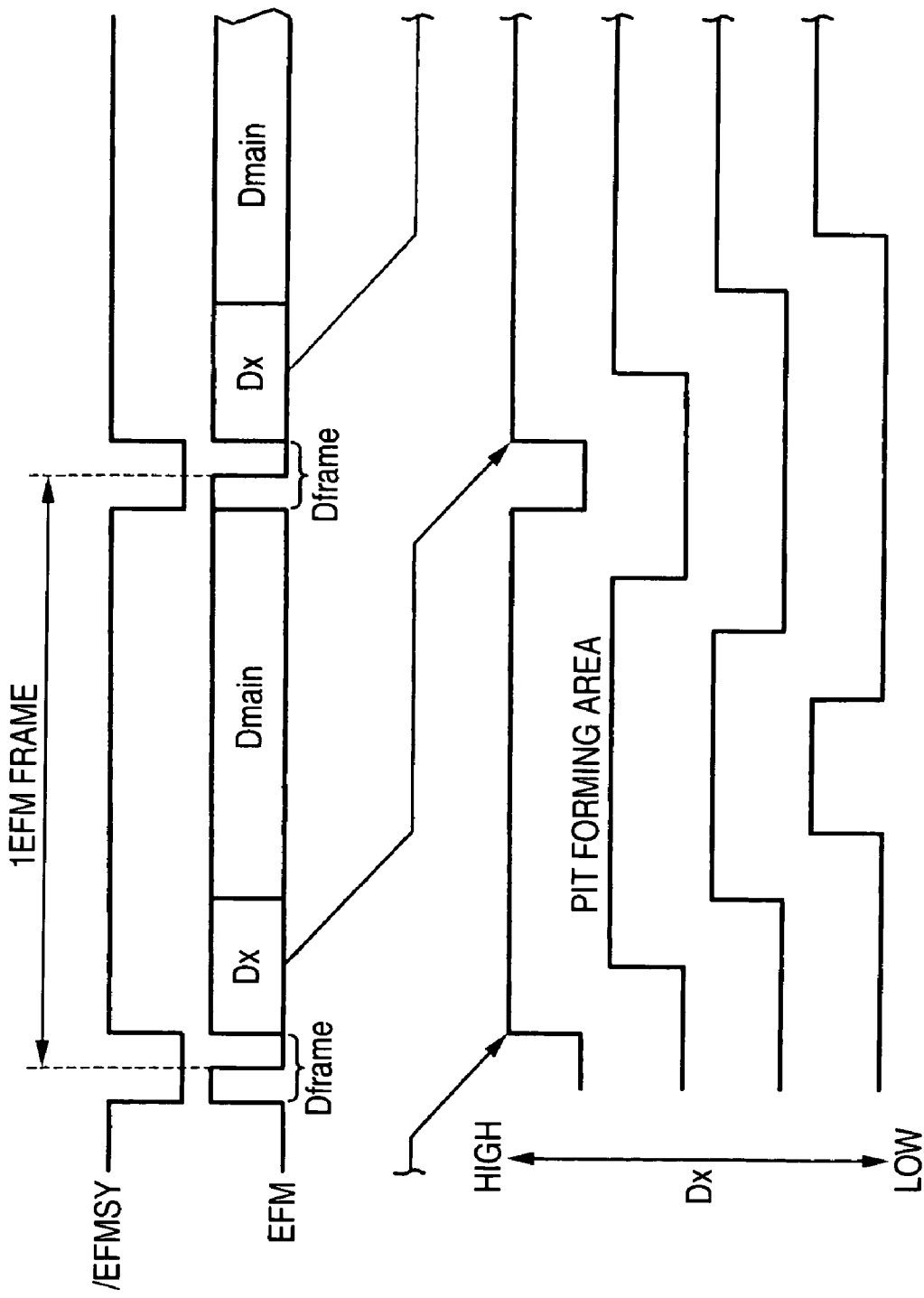
FIG. 15 is a view explaining the tone representation in the visible image forming data.

FIG. 15 shows the relationship between the EFM frame and the pit forming area. The visible image forming data Dx in a certain EFM frame represents the pit forming area in the next EFM frame. In FIG. 15, the subcode data Dsub portion of the first recording data as the EFM signal being output from the encoder 17 is replaced with the visible image forming data Dx. The visible image forming data Dx are extracted from the EFM data, and transformed into the signal designating the pit forming area. The pit 202P whose length is defined by the main data Dmain is formed in the designated area. The visible image forming data Dx represents the tone by using a width of the pit forming area. The pit forming area becomes wider as the tone becomes higher, while the pit forming area becomes narrower as the tone becomes lower.

Meanwhile, the subcode data cannot be replaced with the visible image forming data in the EFM frames having the synchronization data S0, S1. The command data Cmx (see FIG. 12) are utilized as the solution of this. Suppose that the command data Cm1 to Cm7 are employed in the frame number 1 and the command data Cm8 to Cm13 are employed in the frame number 2, and such data may be held by the register, or the like.

Next, particular configuration and operation used in the visible image formation will be explained hereunder.

Figure 16:
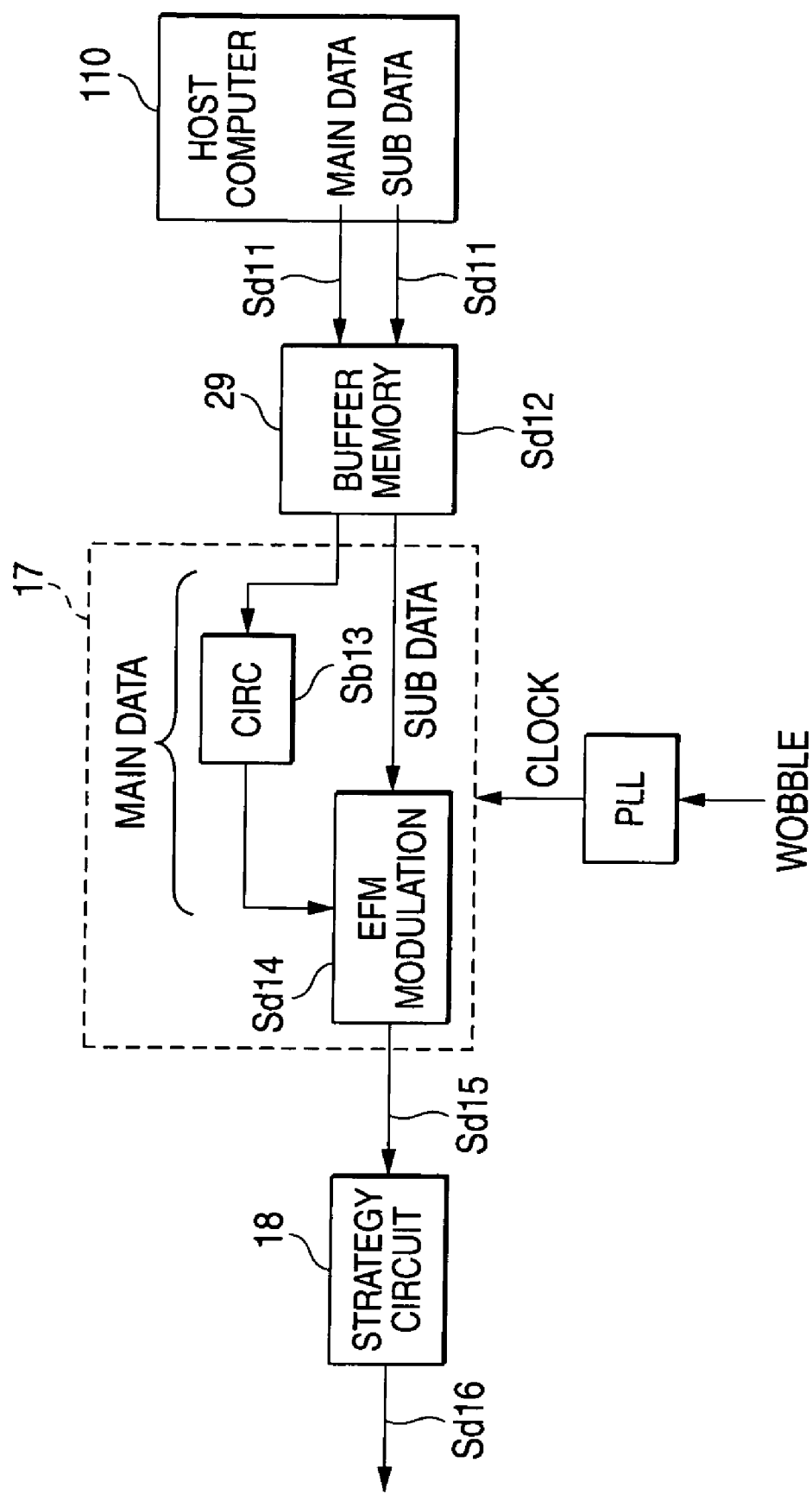
FIG. 16 is a view explaining an operation of an optical disk recording apparatus 100 upon executing the data recording.

At first, a flow of the data in the conventional configuration used to execute the data recording will be explained by way of comparison. FIG. 16 is a view showing a flow of the data in the optical disk recording apparatus 100 upon executing the data recording.

In case the data recording is carried out, the main data and the subcode data to be recorded on the optical disk 200 are transferred from the host computer 110 to the optical disk recording apparatus 100 (step Sd11). The main data and the subcode data after transferred are stored once in the buffer memory 29 under control of the control portion 16 in the optical disk recording apparatus 100 (step Sd12). The main data and the subcode data after stored are read sequentially and output to the encoder 17. The main data are output to CIRC in which the error correcting code is added, the interleaving to distribute the data to a plurality of frames is applied, and others are applied (step Sd13), and are subjected to the EFM modulation (step Sd14). The subcode data are subjected directly to the EFM modulation (step Sd14). Both data constitute the first recording data and are output to the strategy circuit 18 (step Sd15). The first recording data are subjected to the waveform modification in the strategy circuit 18 and then output to the laser driver 19 (step Sd16). Because the encoder 17 employs at this time the wobble signal recorded on the pregroove and the clock being multiplexed from the synchronizing signal, the width of the EFM frame after recorded is constant irrespective of the radius position.

Figure 17:
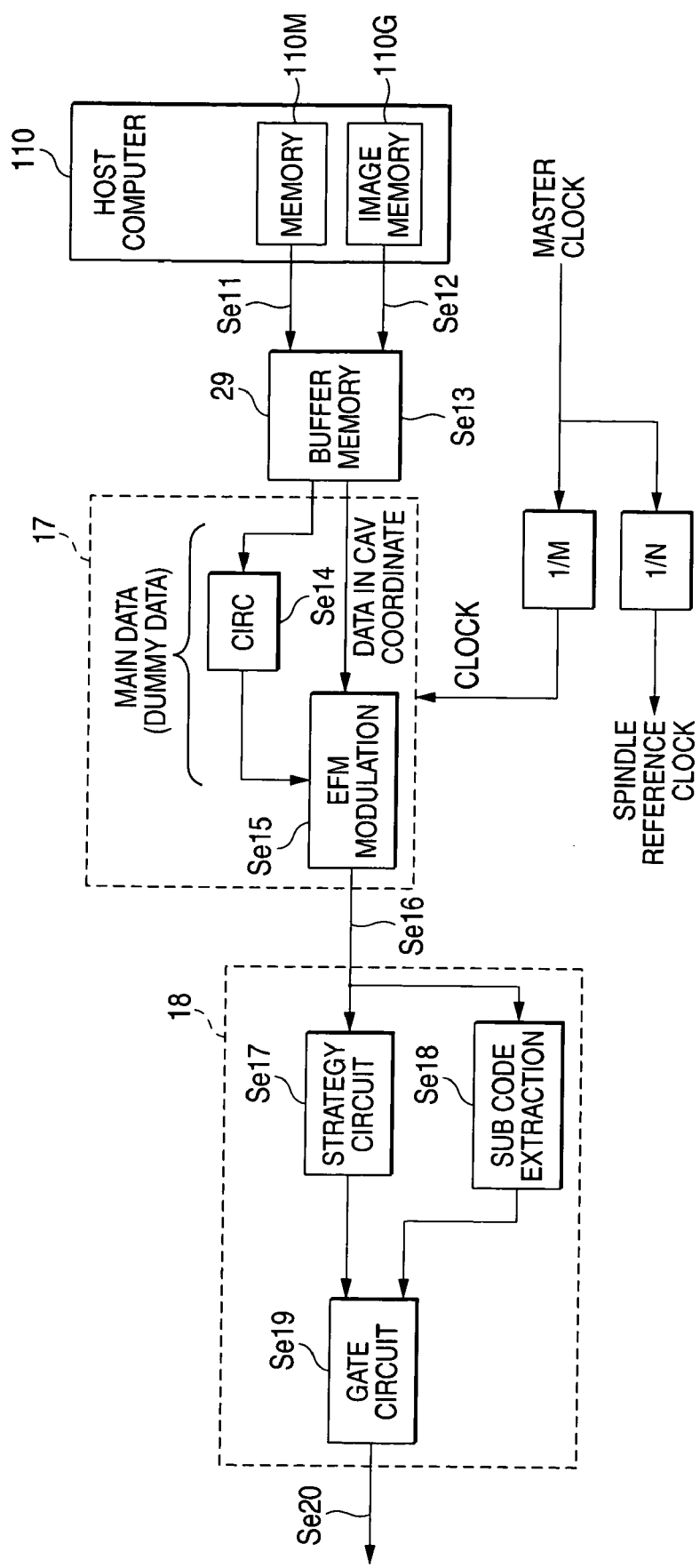
FIG. 17 is a view explaining an operation of the optical disk recording apparatus 100 upon executing the visible image formation.

In turn, a flow of the data taken when the visible image formation is executed in the present embodiment will be explained hereunder. FIG. 17 shows a flow of the data in the optical disk recording apparatus 100 upon executing the visible image formation. This configuration is different from the conventional configuration in a respect that a subcode extraction circuit and a gate circuit are provided to the strategy circuit 18. The spindle reference clock and the clock supplied to the encoder are different.

First, the main data as the dummy data are stored in the memory 110M in the host computer 110. The visible image forming data are stored in the image memory 110G. Then, both data are transferred to the buffer memory 29 (steps Se11, Se12, Se13). Then, the main data as the dummy data and the visible image forming data stored in the buffer memory 29 are read in sequence. Then, the main data as the dummy data are output to the CIRC where the addition of the error correcting code, etc. are executed (step Se14), and are subjected to the EFM modulation (step Se15). The visible image forming data are subjected directly to the EFM modulation (step Se15) Both data constitute the first recording data in which the subcode data portion is replaced with the visible image forming data, and are output to the strategy circuit 18 (step Se16). The first recording data in which the subcode data portion is replaced with the visible image forming data are subjected to the waveform modification in the strategy circuit 18, and output to the gate circuit (step Se17). At the same time, the subcode data portion is extracted as the visible image forming data, then is subjected to the EEM demodulation to generate the visible image forming data, and then the pit forming area signal is generated from the visible image forming data (step Se18). Then, the generated pit forming area signal is output to the gate circuit in synchronism with the timing at which the frame synchronization data Dframe of the next EFM frame is sensed. Then, the gate circuit extracts the signal being output from the strategy circuit 18 only for an ON period of the pit forming area signal (step Se19), and then outputs such signal to the laser driver 19 (step Se20). In this way, the laser beam irradiation onto the optical disk 200 is applied and the visible image formation is executed. Since the encoder 17 employs the clock having a predetermined ratio to the reference clock of the spindle motor 11, the EFM frame after recorded has a constant angular width regardless of the radius position and thus can be handled as the sector in the polar coordinate representation.

With the above, the flow of the data in the visible image forming system 700 when the visible image formation is executed is explained.

(Timing Chart)

Figure 18:
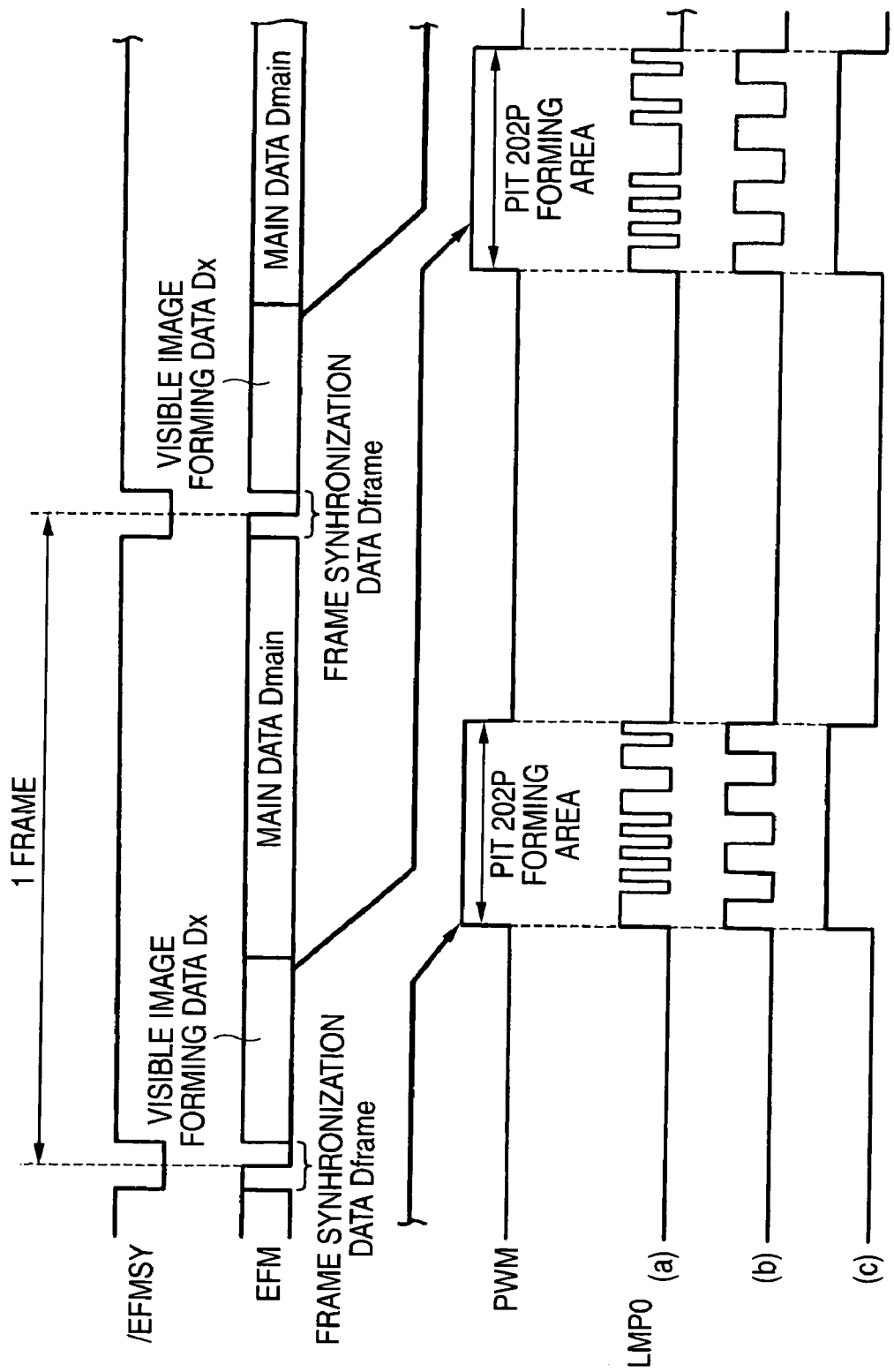
FIG. 18 is a timing chart showing operation contents of the optical disk recording apparatus 100.

FIG. 18 shows a timing chart of processing signals in the strategy circuit 18 when the visible image formation is executed. Respective terms given on the left side are signal names.

A signal "/EFMSY" is a negative logic signal indicating the position of the frame synchronization data Dframe. A period required until the signal "/EFMSY" goes to a low level subsequently after it went to the low level corresponds to one frame period.

A signal "EFM" is a signal indicating the first recording data. In the first recording data, the subcode data Dsub subsequent to the frame synchronization data Dframe is replaced with the visible image forming data Dx.

A signal "tone PWM" is a signal indicating the pit forming area that is pointed by the visible image forming data Dx that are extracted from the first recording data. The visible image forming data Dx are information indicating the tone, and the tone is represented by varying the width of the pit forming area. The tone PWM signal is generated from the visible image forming data Dx in a certain frame, and is used as the gate signal designating the pit forming area in the next frame.

A signal "LMP0" is a signal that is output to the laser driver 19. A signal "LMP0($a$)" is a signal that is obtained by gate-processing the first recording data, which were subjected to the waveform modification by the strategy circuit, by the tone PWM signal. In one frame, the pit 202P having the length defined by the first recording data is formed in the area that is designated by the tone PWM signal.

Figure 19A:
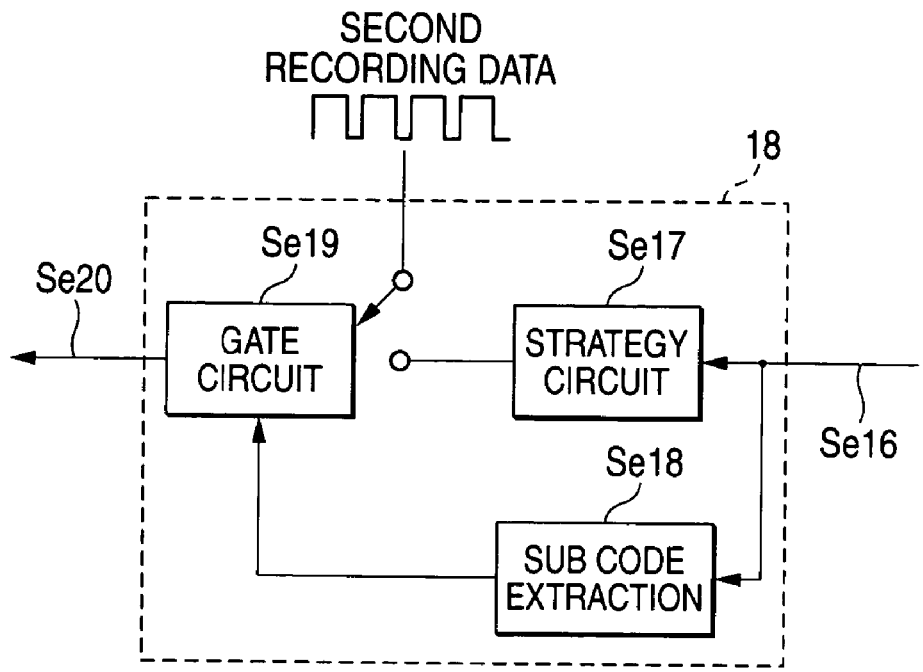
FIG. 19A is a view explaining a variation of the present invention.

A signal "LMP0($b$)" indicates the case that second recording data are employed as the recording data instead of the first recording data. FIG. 19$a$ shows the case that a pulse signal with any duty cycle is employed as the second recording data and the gate processing is carried out by using the tone PWM signal. Any signal such as the clock signal, a test recording signal, or the like, which is provided to the optical disk recording apparatus 100, can be utilized.

Figure 19B:
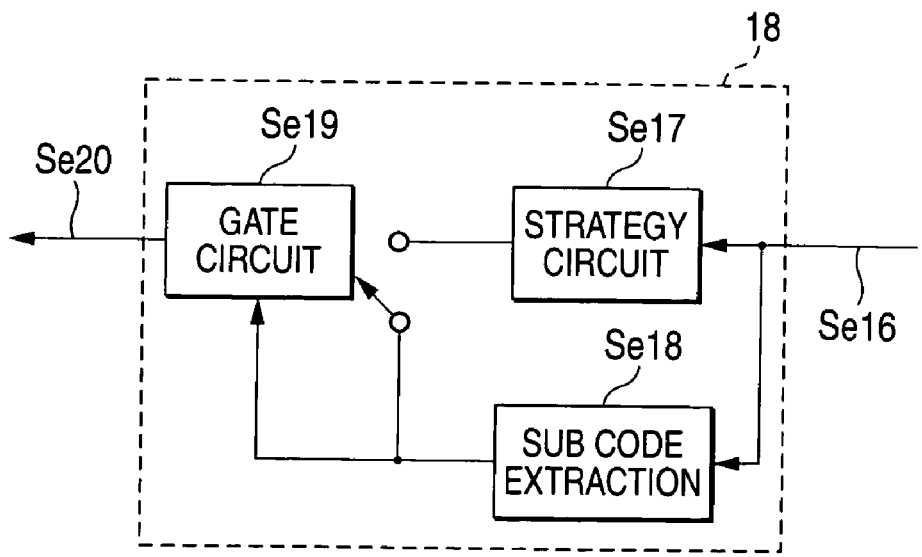
FIG. 19B is a view explaining another variation of the present invention.

A signal "LMP0($c$)" indicates the case that the tone PWM signal is employed as the recording data in place of the first recording data. FIG. 19B shows the case where the tone PWM signal is employed as the second recording data and the gate processing is executed by using the tone PWM signal. In this case, the visible image in the highest tone can be formed. The configuration in which the tone PWM signal passes through the gate circuit is employed by way of comparison. In this case, the tone PWM signal may be output directly to the laser driver 19.

As described above, if the visible image forming system 700 according to the present embodiment is employed, the process can be executed by using the signal processing circuit such as the encoder 17, the strategy circuit 18, or the like, which is provided to the optical disk recording apparatus 100, either when the data recording is applied to the optical disk 200 or when the visible image formation is applied. In other words, not only the data recording but also the visible image formation can be attained by using the existing signal processing circuit, which is capable of executing the high-speed processing, without expansion of the circuit scale of the system (Variations)

The contents of the above embodiment is given merely as an example to explain the contents of the present invention. The present invention can be varied arbitrarily in a range not to depart from a spirit and a scope of the present invention.

(1) In the above embodiment, 1 cell constituting the visible image is assigned every frame. In contrast, the visible image may be formed by assigning a plurality of cells every frame.

For example, the area occupied by one frame on the optical disk 200 is divided into two areas, and then one cell may be assigned to respective divided areas. In this case, the pit forming area data corresponding to two areas are given in one frame.

FIG. 20 shows an example of the contents of the visible image forming data Dx according to the present variation. Here, two PWMs (0, 1, 2) as the tone data indicated by 3 bits are assigned to one frame.

According to the present variation, since a plurality of cells are assigned to the area that is occupied by one frame on the optical disk 200, the resolution of the formed visible image can be improved. The present variation is effective in the case that the resolution of the image is looked upon as important.

(2) The data of the index P and the index Q out of the subcode data Dsub are significant data that are correlated with the recording position, the recording time, etc. of the optical disk 200. These P data and Q data may be left as they are, and only other subcode data (R data, . . . , W data) may be replaced with the visible image forming data.

FIG. 21 shows the contents of the visible image forming data Dx in the present variation. According to the present variation, because the P data and the Q data are left, the similar control to the case the data recording is executed can be applied.

In this case, if the encoder clock that is operated in synchronism with the multiplexed clock of the wobble signal is employed in the P data and the Q data and the visible image forming data using the R to W data are set to a predetermined ratio to the reference clock of the spindle motor 11, the visible image formation can be executed at the same time as the normal data recording.

(3) A part or all of the main data Dmain may be replaced with the visible image forming data. For example, since the first byte of the main data is not affected by the interleaving, such first byte can be extracted easily. If the data in the second byte et seq. are arranged previously in the opposite position to the interleaving to take account of the interleaving rule and then the interleaving is cancelled at the time of storing the data into the image memory 110G or extracting the data therefrom, such data can be acquired.

When the main data Dmain are replaced with the visible image forming data, a large quantity of data can be employed rather than the case where the subcode data Dsub are replaced with the visible image forming data. Thus, the visible image with the higher resolution can be formed by increasing the number of cells per one EFM sector. Otherwise, the visible image with the larger gradient can be formed.

(4) In the above embodiment, in order to understand easily the configuration (see FIG. 1) of the optical disk recording apparatus 100, the explanation is made while using the encoder 17, the strategy circuit 18, the laser driver 19, and the optical pickup 10 as separate constituent elements respectively.

In contrast to this, the configuration in which several constituent elements are put together into one element may be employed. For example, the encoder 17 and the strategy circuit 18 are often designed as one dedicated IC in the actual optical disk recording apparatus 100. The laser driver 19 and the strategy circuit 18 may be installed into the optical pickup 10.

(5) The optical disk recording media, e.g., the CD-RW (Compact Disc-ReWritable) disk, the data recordable DVD (Digital Versatile Disc), the blue-laser recordable optical disk, and the like other than the CD-R disc may be supposed as the optical disk 200. The optical disk on the label face of which the visible image can be displayed by the laser may be employed. Since the present invention does not need the wobble, etc., the media having no pregroove may be employed. In any case, the present invention can be applied to the system in which the data recording is executed by applying the laser beam onto the optical disk to form the areas each having different reflectance. Further, if at least a part of the recording data can be replaced with the visible image forming data by exchanging a part or all of the recording data into the visible image forming data prior to the decoding even though the recording data formats are different according to the recording media, the visible image formation can be applied quickly to the optical disk not to enlarge the circuit scale of the system, like the above embodiment.

What is claimed is:

1. A visible image forming method of forming a visible image on an optical disk by using an optical disk recording apparatus comprising the steps of:
   generating first recording data at a generation frequency that makes a recording density on the optical disk constant;
   replacing at least a part of a data unit constituting the first recording data with visible image forming data;
   controlling the generation frequency and a rotation frequency of the optical disk into a predetermined ratio;
   extracting the visible image forming data from the first recording data every predetermined quantity of the first recording data;
   deciding a pit forming area designated by the visible image forming data; and
   applying a laser beam onto the optical disk to form a pit with a length defined by the first recording data in the pit forming area.

2. The visible image forming method according to claim 1, wherein the data unit includes a subcode data portion and a main data portion, and
   wherein either a part or all of the subcode data portion or a part or all of the main data portion is replaced with the visible image forming data.

3. The visible image forming method according to claim 1, further comprising transforming bit map data, which represent image contents on orthogonal coordinates, into data designating the pit forming area, in which a pit whose length is defined by recording data in individual data units of the first recording data is formed, as the visible image forming data.

4. A visible image forming method of forming a visible image on an optical disk by using an optical disk recording apparatus comprising the steps of:
   generating first recording data at a generation frequency that makes a recording density on the optical disk constant;
   replacing at least a part of a data unit constituting the first recording data with visible image forming data;
   controlling the generation frequency and a rotation frequency of the optical disk into a predetermined ratio;
   extracting the visible image forming data from the first recording data every predetermined quantity of the first recording data;
   deciding a pit forming area designated by the visible image forming data;
   selecting second recording data in place of the first recording data; and
   applying a laser beam onto the optical disk to form a pit with a length defined by the second recording data in the pit forming area.

5. The visible image forming method according to claim 4, wherein the data unit includes a subcode data portion and a main data portion, and
   wherein either a part or all of the subcode data portion or a part or all of the main data portion is replaced with the visible image forming data.

6. The visible image forming method according to claim 4, further comprising transforming bit map data, which represent image contents on orthogonal coordinates, into data designating the pit forming area, in which a pit whose length is defined by recording data in individual data units of the first recording data is formed, as the visible image forming data.

7. A visible image forming method of forming a visible image on an optical disk by using an optical disk recording apparatus comprising the steps of:
   generating first recording data at a generation frequency that makes a recording density on the optical disk constant;
   replacing at least a part of a data unit constituting the first recording data with visible image forming data;
   controlling the generation frequency and a rotation frequency of the optical disk into a predetermined ratio;
   extracting the visible image forming data from the first recording data every predetermined quantity of the first recording data;

deciding a pit forming area designated by the visible image forming data; and applying a laser beam onto the optical disk to form a pit with a length corresponding to the pit forming area.

8. The visible image forming method according to claim 7, wherein the data unit includes a subcode data portion and a main data portion, and wherein either a part or all of the subcode data portion or a part or all of the main data portion is replaced with the visible image forming data.

9. The visible image forming method according to claim 7, further comprising transforming bit map data, which represent image contents on orthogonal coordinates, into data designating the pit forming area, in which a pit whose length is defined by recording data in individual data units of the first recording data is formed, as the visible image forming data.

10. A computer readable recording medium storing a program that causes, to form a visible image on an optical disk, a visible image forming system including a host computer and an optical disk recording apparatus that generates first recording data at a generation frequency that makes a recording density on the optical disk constant, and applies a laser beam onto the optical disk in response to the first recording data to form a pit with a length defined by the first recording data on the optical disk, the program causing the visible image forming system to:

replace at least a part of the first recording data with visible image forming data every predetermined quantity of the first recording data;

control the generation frequency and a rotation frequency of the optical disk into a predetermined ratio;

extract the visible image forming data from the first recording data every predetermined quantity of the first recording data;

decide a pit forming area designated by the visible image forming data; and form a pit with a length defined by the first recording data in the pit forming area.

11. A visible image forming system for forming a visible image on an optical disk comprising:

a data generating portion that generates first recording data at a generation frequency that makes a recording density on the optical disk constant;

a laser beam applying portion that applies a laser beam onto the optical disk in response to the first recording data to form a pit with a length defined by the first recording data on the optical disk;

a recording data generating portion that replaces at least a part of the first recording data with visible image forming data every predetermined quantity of the first recording data;

a controlling portion that controls the generation frequency and a rotation frequency of the optical disk into a predetermined ratio;

a visible-image forming data extracting portion that extracts the visible image forming data from the first recording data every predetermined quantity of the first recording data;

a pit-forming area deciding portion that decides a pit forming area designated by the visible image forming data for forming a visible image on an optical disk; and a pit forming portion that forms a pit with a length defined by the first recording data in the pit forming area.

12. The visible image forming system according to claim 11, wherein the data generating portion and the laser beam applying portion are provided in an optical disk recording apparatus.

* * * * *